US012587832B2

(12) United States Patent
Visa et al.

(10) Patent No.: US 12,587,832 B2
(45) Date of Patent: Mar. 24, 2026

(54) METHOD AND APPARATUS FOR SIGNALING NETWORK CODING CAPABILITIES

(71) Applicant: CANON KABUSHIKI KAISHA, Tokyo (JP)

(72) Inventors: Pierre Visa, Rennes (FR); Pascal Lagrange, La Chapelle des Fougeretz (FR); Philippe Le Bars, Thorigne-Fouillard (FR); Romain Guignard, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 17/925,442

(22) PCT Filed: May 6, 2021

(86) PCT No.: PCT/EP2021/061979
§ 371 (c)(1),
(2) Date: Nov. 15, 2022

(87) PCT Pub. No.: WO2021/233689
PCT Pub. Date: Nov. 25, 2021

(65) Prior Publication Data
US 2023/0188973 A1      Jun. 15, 2023

(30) Foreign Application Priority Data

May 20, 2020      (GB) ...................................... 2007550

(51) Int. Cl.
*H04W 8/24*          (2009.01)
(52) U.S. Cl.
CPC ..................................... *H04W 8/24* (2013.01)

(58) Field of Classification Search
CPC ......... H04W 8/24; H04W 8/245; H04W 8/26; H04W 76/15; H04W 76/25; H04W 76/20; H04W 28/04; H04W 28/0205
(Continued)

(56) References Cited

U.S. PATENT DOCUMENTS 9,655,021 B2 * 5/2017 Tie ...................... H04W 36/302
10,405,175 B2 9/2019 Henttonen
(Continued)

FOREIGN PATENT DOCUMENTS

EP            2736188 A1      5/2014

OTHER PUBLICATIONS

Huawei, HiSilicon, Clarification of objectives of the IIoT Rel-16 study[online], 3GPP TSG RAN #81, 3GPP, Sep. 13, 2018, RP-181690.
(Continued)

*Primary Examiner* — Jean A Gelin
(74) *Attorney, Agent, or Firm* — Canon U.S.A., Inc. IP Division

(57) ABSTRACT

The present invention concerns a method of transmitting over a radio access network to a base station, by a network entity, a radio resource control signalling indicating the capability of a user equipment to perform network coding, wherein the method comprises: detecting by the network entity of a trigger event for signalling to the base station, the network coding capabilities of the user equipment; generating by the network entity a radio resource control signalling message comprising the user equipment network coding capabilities; and transmitting by the network entity of the generated radio resource control signalling message to the base station.

22 Claims, 24 Drawing Sheets

(58) Field of Classification Search
USPC ...................................................... 455/422.1
See application file for complete search history.

(56) References Cited

U.S. PATENT DOCUMENTS

| 2012/0263100 | A1* | 10/2012 | Yuan ................. | H04B 7/15521 |
| | | | | 370/328 |
| 2014/0146707 | A1* | 5/2014 | Medapalli ............. | H04L 1/1825 |
| | | | | 370/254 |
| 2016/0191134 | A1* | 6/2016 | Jeon ................... | H04B 7/15521 |
| | | | | 375/267 |
| 2016/0323892 | A1 | 11/2016 | Pradini | |
| 2018/0279168 | A1* | 9/2018 | Jheng ..................... | H04L 5/001 |
| 2019/0387561 | A1 | 12/2019 | Paladugu | |
| 2023/0176212 | A1* | 6/2023 | Kim .......................... | G06T 7/80 |
| | | | | 455/456.1 |
| 2024/0048287 | A1* | 2/2024 | Liu ....................... | H04L 1/1832 |

OTHER PUBLICATIONS

OPPO, Procedure for capability ID assignment[online], 3GPP TSG SA WG2 #132, 3GPP, Apr. 12, 2019, S2-1903216.

Discussion on the application of Network Coding for efficient PDCP Duplication with more than 2 copies; China Unicom; 3GPP Draft; R3-194503; Aug. 17, 2019; XP051761805; http://www.3gpp.org/ftp/Meetings_3GPP_SYNC/RAN3/Docs [Accessed Oct. 23, 2020].

\* cited by examiner

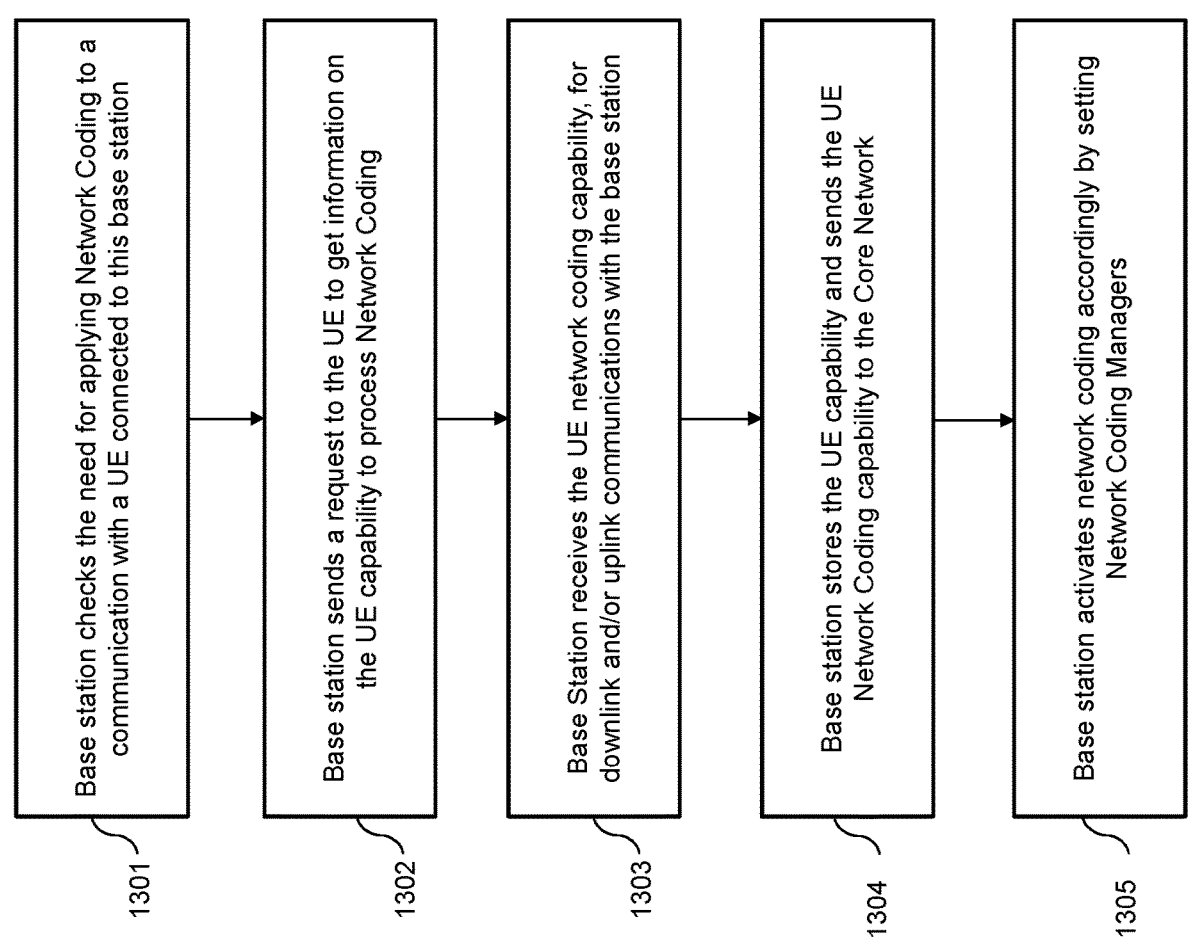

Figure 13

1301　Base station checks the need for applying Network Coding to a communication with a UE connected to this base station 1302　Base station sends a request to the UE to get information on the UE capability to process Network Coding 1303　Base Station receives the UE network coding capability, for downlink and/or uplink communications with the base station 1304　Base station stores the UE capability and sends the UE Network Coding capability to the Core Network 1305　Base station activates network coding accordingly by setting Network Coding Managers

1300

UE receives a request from Base Station to produce UE capability

1401

UE sends UE capability to Base Station

1402

1400

1501

Core Network receives a message from Base Station Containing UE NC Capabilities

1502

Core Network stores the UE NC capacities

1500

1601 Base Station receives a report from UE

1602 Base Station analyses report

1603 Base station stores the UE Network Coding capability and sends the capability to the Core Network

1600

UE detects status change

1701

UE sends a report to the Base Station

1702

1700

1901

1902

Core networks sends a message to the Base Station

Core networks receives a message
And store capabilities

1900

UE receives a RRC setup message

2001

UE sends UE capability to Base Station, using the RRCComplete message

2002

2000

Base station sends a RRCSetup message.

2101

Base station receives a RRCComplete message

2102

Base station stores and forward the NC capability
To the Network Core

2103

2100

Base station sends a request to the network core entity to get information on a UE capability to process Network Coding

2301

Base Station receives the UE network coding capability, for downlink and/or uplink communications with the base station

2302

Base station stores the UE capability

2303

2300

Core network entity receives a request from Base Station to produce at least the network coding capability of a UE

2401

Core network entity sends UE capability to Base Station

2402

2400

METHOD AND APPARATUS FOR SIGNALING NETWORK CODING CAPABILITIES

CROSS-REFERENCE TO RELATED APPLICATIONS

This application is the National Phase application of PCT Application No. PCT/EP2021/061979, filed on May 6, 2021 and titled "METHOD AND APPARATUS FOR SIGNAL-LING NETWORK CODING CAPABILITIES". This application claims the benefit under 35 U.S.C. § 119(a)-(d) of United Kingdom Patent Application No. 2007550.3, filed on May 20, 2020 and entitled "METHOD AND APPARATUS FOR SIGNALLING NETWORK CODING CAPABILI-TIES". The above cited patent applications are incorporated herein by reference in their entireties.

FIELD OF THE INVENTION

The present disclosure concerns a method and a device for signalling network coding capabilities of a device in a radio communication system. It concerns more particularly data transmission robustness improvement.

BACKGROUND OF INVENTION

Wireless communication systems are largely deployed to address a wide range of applications, ranging from mobile broadband, massive machine type communications and Ultra Reliable Low Latency Communications (URLLC). Such systems allow a plurality of user equipments (UE) or mobile terminals (MT) to share the wireless medium to exchange several types of data content (e.g. video, voice, messaging . . . ) over a radio access network (RAN) through one or more base stations. Examples of such wireless multiple-access communication systems include systems based on 3rd generation partnership project (3GPP) standards, such as fourth-generation (4G) Long Term Evolution (LTE) or recent fifth-generation (5G) New Radio (NR) systems, or systems based on IEEE 802.11 standards, such as WiFi.

URLLC type of communication is particularly relevant in an Industrial Internet of Things (I-IoT or IIOT or IIoT) environment where communication reliability, and thus communication service availability, is essential to prevent service disruption, while low-latency, which relates to the end-to-end delay of the communication, is required, for instance to avoid introducing downtime of equipments or to ensure predictive deterministic data reception.

Several techniques may be considered to ensure communication reliability, such as Automatic Repeat request (ARQ) or on-demand retransmission schemes based on acknowledge messaging, even though the low-latency requirement would be hardly met.

To reduce this issue, a mechanism of packet duplication is provided, known as Packet Data Convergence Protocol (PDCP)T duplication in 3GPP and described in the specification TS 38.323, where the packets are systematically sent and received over two different carrier frequencies instead of one. However, packet duplication is not optimal as it suffers from a lack of coding diversity while doubling the bandwidth requirements.

The introduction of network coding for the RAN communications leads to consider an appropriate signalling between the involved radio devices, i.e. the UE and the base station. In particular the capability to support network coding has to be assessed prior to actual network coding activation.

Indeed, in a 5G system, UEs may be dedicated to specific applications, thus not supporting all the specified features, even though implementing the same 5G standard baseline.

Moreover, several different network coding schemes may be considered and a device (UE or gNB) may only support a sub-set of all possible options of network coding.

Also, a UE may be a mobile device with limited processing resources and a limited battery capacity. Therefore a UE may only support network coding under some conditions related to its levels of processing load and actual battery level.

3GPP specification document TS 38.306 defines the New Radio (NR) UE radio access capability parameters. U.S. Pat. No. 10,405,175 "Capability Signalling for Dual Connectivity" addresses UE capability signalling for Dual-Connectivity (DC). However, none of the two aforementioned documents deals with network coding.

SUMMARY OF THE INVENTION

The present invention has been devised to address one or more of the foregoing concerns. It deals with a signalling method dedicated to Network Coding (NC) capability sharing between wireless (e.g. 5G, 4G-LTE, 802.11) devices. According to this method, the UE can indicate its capability to support NC, and also inform on the list of supported NC schemes, if available, as well as the potential restrictions that may prevent it from performing NC, like for example a maximum number of supported network coded streams.

The UE Network Coding (NC) capability may be obtained by the base station (e.g gNB or eNB) when the base station determines that such information is needed. UE Network Coding (NC) capability may also be requested by the gNB upon former request from the core network (e.g. 5GC or EPC) and further forwarded by the gNB to the core network.

The UE Network Coding (NC) capability may be available in the form of specific fields added in an information element (IE) carried by Radio Resource Control (RRC) messages. These RRC messages should belong to a set of standardized messages (see also TS 38.331 specifications) to implement the RRC protocol in the RAN control plane.

According to an aspect of the invention, it is proposed a method of transmitting over a radio access network to a base station, by a network entity, a radio resource control signalling indicating the capability of a user equipment to perform network coding, wherein the method comprises:

detecting by the network entity of a trigger event for signalling to the base station, the network coding capabilities of the user equipment;

generating by the network entity a radio resource control signalling message comprising the user equipment network coding capabilities; and transmitting by the network entity of the generated radio resource control signalling message to the base station.

In an embodiment, the method further comprises:

receiving by the network entity of a radio resource control signalling request from the base station, this reception constituting the trigger event.

In an embodiment, the method further comprises:

checking the need for network coding activation by the base station prior to transmitting the radio resource control signalling request to the network entity.

In an embodiment, the method further comprises:

detecting by the network entity of a status change of the network entity, this status change constituting the trigger event.

In an embodiment, the method further comprises:

transmitting by the base station to a core network a radio resource control signalling message comprising the user equipment network coding capabilities.

In an embodiment, the method further comprises:

receiving by the base station of a radio resource control signalling request from the core network prior to the transmission of the radio resource control signalling message to the core network.

In an embodiment, the user equipment network coding capabilities are stored by the core network.

In an embodiment, the user equipment network coding capabilities comprise information indicating that the user equipment supports network coding processing.

In an embodiment, the user equipment network coding capabilities comprises information indicating the network coding scheme supported by the user equipment.

In an embodiment, the information indicating the network coding scheme is related to an information on packet data convergence protocol packet duplication capabilities.

In an embodiment, the user equipment network coding capabilities comprise information related to some network coding capability restrictions.

In an embodiment, the user equipment network coding capabilities comprise information indicating the support of network coding through multi-connectivity.

In an embodiment, the user equipment network coding capabilities comprise information indicating the support of network coding through carrier aggregation.

In an embodiment, the user equipment network coding capabilities comprise information indicating the support of network coding encoding, decoding, or encoding and decoding.

In an embodiment, the user equipment network coding capabilities comprise information indicating a maximum of supported streams on which network coding is applied.

In an embodiment, the user equipment network coding capabilities comprise information related to the processor capacity of the user equipment.

In an embodiment, the user equipment network coding capabilities comprise information indicating a temporary incapacity to perform network coding processing.

In an embodiment, the user equipment network coding capabilities comprise information of a class of the user equipment, the class being associated with a set of network coding capabilities.

In an embodiment, the method further comprises:

activating by the base station of the network coding according to the capabilities of the user equipment to perform network coding.

According to another aspect of the invention, it is proposed a computer program product for a programmable apparatus, the computer program product comprising a sequence of instructions for implementing a method according to the invention, when loaded into and executed by the programmable apparatus.

According to another aspect of the invention, it is proposed a computer-readable storage medium storing instructions of a computer program for implementing a method according to the invention.

According to another aspect of the invention, it is proposed a computer program which upon execution causes the method of the invention to be performed.

According to another aspect of the invention, it is proposed a network entity device for transmitting over a radio access network to a base station, a radio resource control signalling indicating the capability of a user equipment to perform network coding, wherein the network entity device comprises a processor configured for:

detecting a trigger event for signalling to the base station, the network coding capabilities of the user equipment;

generating a radio resource control signalling message comprising the user equipment network coding capabilities; and transmitting by the network entity of the generated radio resource control signalling message to the base station.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 13 illustrates a flowchart of an example of a method that supports the indication of Network Coding Capabilities by a UE to a Base Station, on the Base Station side.

DETAILED DESCRIPTION OF THE INVENTION

Figure 1:
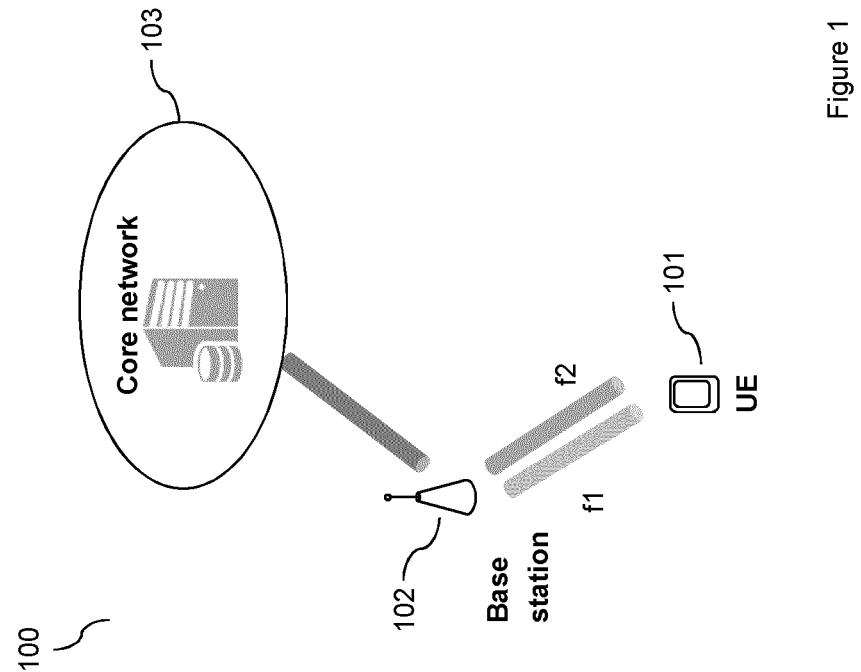
FIG. 1 illustrates a radio access network (RAN) topology with carrier aggregation allowing the operation of a network coding scheme.

FIG. 1 illustrates a radio access network (RAN) topology with carrier aggregation allowing the operation of a network coding scheme.

It presents an example of a wireless communication system 100, such as a 5G NR (New Radio) network that may benefit from the invention. The wireless communication system includes User Equipment (UE) 101, and a base station 102, which may communicate wirelessly with the UE. Several other UEs and other base stations, not represented on the figure, may also be part of this system. The wireless communication system may be a New Radio (NR) network, a Long term Evolution (LTE) network or a LTE-Advanced (LTE-A) network. The base station may refer, without limitation, to a radio transceiver, an eNodeB (eNB) or a next-generation Node B (gNB). UE 101 may be capable of communicating with any kind of base station or with a limited type of base station through the Radio Access Network (RAN).

Base station 102 is connected to the core network 103, which may be, for instance, a 5G Core (5GC) or an Evolved Packet Core (EPC). The connection between the base station and the core network entities may be either wired or wireless.

UEs, base stations, and core network constitute connected network entities of the wireless network.

Carrier aggregation (CA) mechanism may be implemented, allowing UE 101 and base station 102 to communicate simultaneously over two different component carrier frequencies denoted f1 and f2. The radio cell defined by the coverage area of f1 is called the Primary Cell, while f2 defines a secondary cell.

Carrier aggregation has been introduced in 4G/LTE standards and enhanced in 5G NR. Other wireless communication standards, such as the latest WiFi generations, also rely on such mechanism. The first objective of carrier aggregation is to increase the data rate per user by transmitting different data over multiple frequency blocks, also referred to as component carriers. Carrier aggregation may be applied to both downlink (DL) transmissions, from base station to UE, and uplink (UL) transmissions, from UE to base station.

One other benefit of carrier aggregation is to offer both time and frequency diversity to error correcting schemes, such as packet duplication or network coding.

According to the PDCP duplication method described in TS 38.323, data coming from the core network 103 are transmitted in the form of Protocol Data Units (PDUs) by base station 102 to UE 101 over one component carrier frequency f1, while a copy of these PDUs are transmitted to UE 101 over a different component carrier frequency f2, simultaneously or not.

In the context of network coding, according to some embodiments of the invention, a first set of linear combinations of PDUs may be transmitted over f1, while a second set of linear combinations may be transmitted over f2. In some embodiments of the invention, the transmission of linear combinations does not rely on Carrier Aggregation i.e. the linear combinations are sent on the same frequency but it is not optimal as the system loses frequency diversity.

Figure 2:
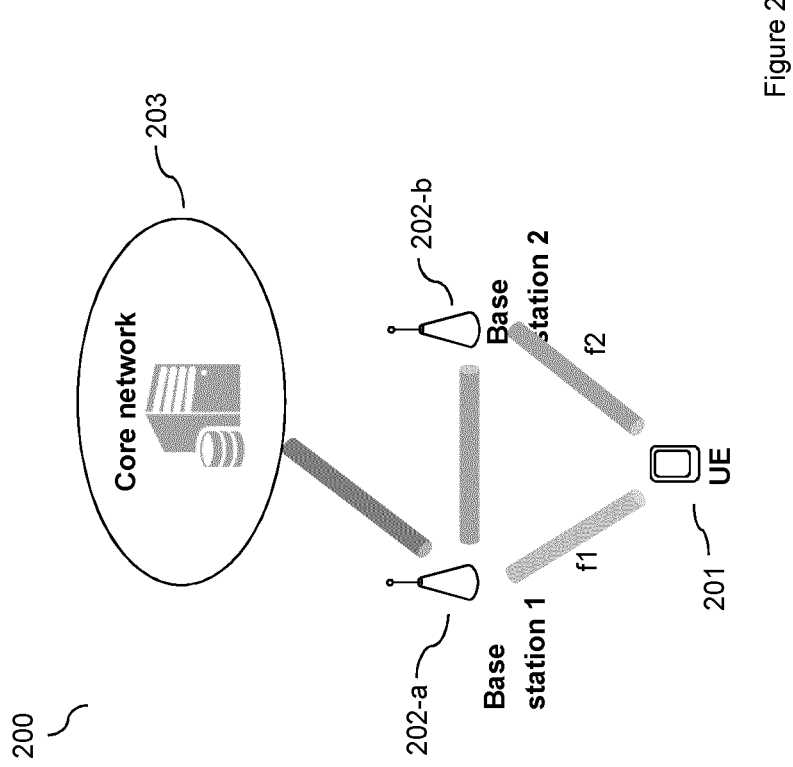
FIG. 2 illustrates a radio access network (RAN) topology with dual-connectivity allowing the operation of a network coding scheme.

FIG. 2 illustrates a radio access network (RAN) topology with dual-connectivity allowing the operation of a network coding scheme.

The figure presents a wireless communication system 200, such as a 5G NR (New Radio) network, that may benefit from the invention. The wireless communication system includes User Equipment (UE) 201, and two base stations 202-a and 202-b, which may communicate wirelessly with the UE. Several other UEs, not represented on the figure, may also be part of this system. The wireless communication system may be a New Radio (NR) network, a Long term Evolution (LTE) network or a LTE-Advanced (LTE-A) network. Each of the base station may refer, without limitation, to a radio transceiver, an eNodeB (eNB) or a next-generation Node B (gNB). UE 102 may be capable of communicating with any kind of base stations or with a limited type of base stations.

Base stations 202-a and 202-b are connected to core network 203, which may be, for instance, a 5G Core (5GC) or an Evolved Packet Core (EPC). The connection between the base stations and the core network entities, as well as the connection between the two base stations, may be either wired or wireless.

Dual-connectivity (DC) mechanism may be implemented, where UE 201 and base station 202-a communicate directly using the f1 frequency band, and where UE 201 also communicates with base station 202-*a* through base station 202-*b* using f2 frequency band. In this particular configuration, base station 202-*a* is referred to as the master node (MN) while f1 frequency band defines a Master Cell Group (MCG). Base station 202-*b* is referred to as the secondary node (SN) and f2 frequency band defines a Secondary Cell Group (SCG).

In some embodiments, f1 frequency and f2 frequency may be the same.

Similar to Carrier aggregation (CA), Dual Connectivity (DC) has been introduced by 3GPP in 4G/LTE standards and enhanced in 5G NR, with the objective to increase user throughput, provide mobility robustness, and support load-balancing amongst base stations. It is applicable to both downlink (DL) and uplink (UL) transmissions.

The other benefit of DC is to offer not only time and frequency diversity, but also spatial diversity to error correcting schemes, such as packet duplication or network coding.

According to the PDCP duplication method described in TS 38.323, data coming from core network 203 are transmitted in the form of Protocol Data Units (PDUs) directly by base station 202-*a* to UE 201 via the MCG, while a copy of these PDUs are transmitted by base station 202-*a* to the base station 202-*b*, which forwards these PDUs to the UE 201 via the SCG. At protocol level, it is said that each PDU is transmitted over a split Data Radio Bearer (DRB), or split bearer, where the same DRB is used on both the MCG and SCG (it is actually split between the MCG and the SCG).

Similarly, in the context of network coding, according to some embodiments of the invention, a first set of linear combinations of PDUs is transmitted directly by base station 202-*a* to the UE 201, while a second set of linear combinations is transmitted by base station 202-*a* to UE 201 through base station 202-*b*.

FIG. 1 and FIG. 2, illustrate two possible communication channels (also referred to as legs) between a base station and a UE. However, the one skilled in the art knows that 5G NR specifications does not limit CA and DC to two legs. More legs may be available by adding other component carriers in CA, or by adding secondary base stations in DC. As a generalization, a multi-connectivity scheme can be established between a UE and a base station that would involve a plurality of additional base stations. Details on Carrier aggregation (CA) and Dual Connectivity (DC) are available in the specifications documents TS 38.300 and TS 37.340.

Figure 3:
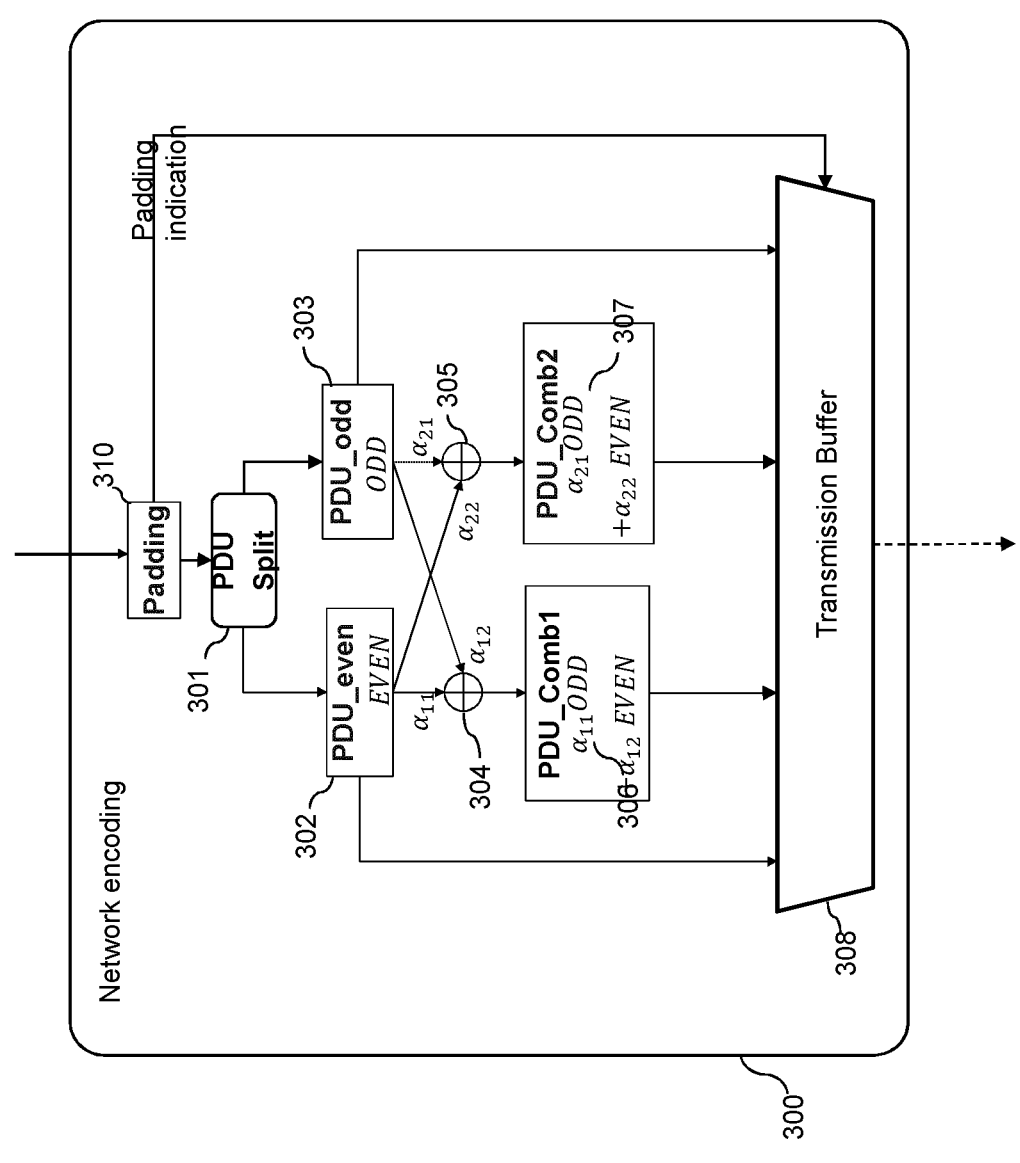
FIG. 3 illustrates an example of network coding scheme with the operations on the transmitter side.

FIG. 3 illustrates an example of network coding scheme with the operations on transmitter side.

It presents an example of network coding scheme, focusing on the encoding aspect of network coding, to be performed by a NC encoder module 300. An incoming PDU is first processed by a padding function 310. If the length of the incoming PDU is odd, one byte of dummy data (all zeroes for example) is appended to the PDU and the padding indication is set as an input for the transmission buffer 308 also in charge of headers processing. The PDU is then processed by PDU splitter 301, which splits the PDU into two parts.

The split may be performed in many different ways. One way to perform the split action is to divide a PDU into two parts of equal size: the (PDU_length/2) first bytes are placed in a so-called even packet, also referred to as EVEN PDU, or EVEN, while the following bytes are gathered in a so-called odd packet, also referred to as ODD PDU, or ODD. As an example of other implementation 1 byte every 2 bytes can be sorted and placed in the EVEN and ODD PDUs. The one skilled in the art may consider other split schemes.

The two parts are stored in buffer 302 for the EVEN PDU, and in buffer 303 for the ODD PDU. Splitting the PDU into two parts is beneficial as reducing the length of transmitted packets reduces the probability of having one bit corrupted during the transmission. Therefore, this also reduces the need for retransmissions that would result from the reception of a corrupted packet.

Through the transmission buffer 308, 4 PDUs will be output. EVEN, ODD, and two PDUs resulting from combinations of EVEN and ODD. The first combined packet, referred to as COMB1 and stored in buffer 306, results from the addition byte to byte of the result of byte to byte multiplications by two different coefficients $\alpha_{11}$ and $\alpha_{12}$ of the bytes within ODD and EVEN (performed by multiply and add unit 304). The second combined packet, referred to as COMB2 and stored in buffer 307, results from the addition byte to byte of the result of byte to byte multiplications by two different coefficients $\alpha_{21}$ and $\alpha_{22}$ of the bytes within ODD and EVEN (performed by multiply and add unit 305).

In some embodiments of the invention, (but non limitative), the operations are made in the Galois Field GF 256. Not all sets of 4 coefficients in GF 256 can be used. A plurality of ones and zeros must be excluded, as they would let the original data unchanged and $(\alpha_{11} \times \alpha_{12})$ shall not be equal to $(\alpha_{21} \times \alpha_{22})$, otherwise the linear combinations would be identical.

A sequence number may also be assigned in transmission buffer 308. The format of such sequence number may be (4n+t), where t belongs to {0,1,2,3}. For instance, the sequence number of any ODD PDU will be in the form 4n (t=0), the sequence number of any EVEN PDU will be in the form (4n+1), the sequence number of any COMB1 PDU will be in the form (4n+2), and the sequence number of any COMB2 PDU will be in the form (4n+3).

Eventually, the four encoded PDUs—i.e. ODD, EVEN, COMB1 and COMB2—are transmitted over different legs (see also FIG. 1 and FIG. 2). For instance ODD and COMB1 are transmitted on a first leg, while EVEN and COMB2 are transmitted on the second leg.

Figure 4:
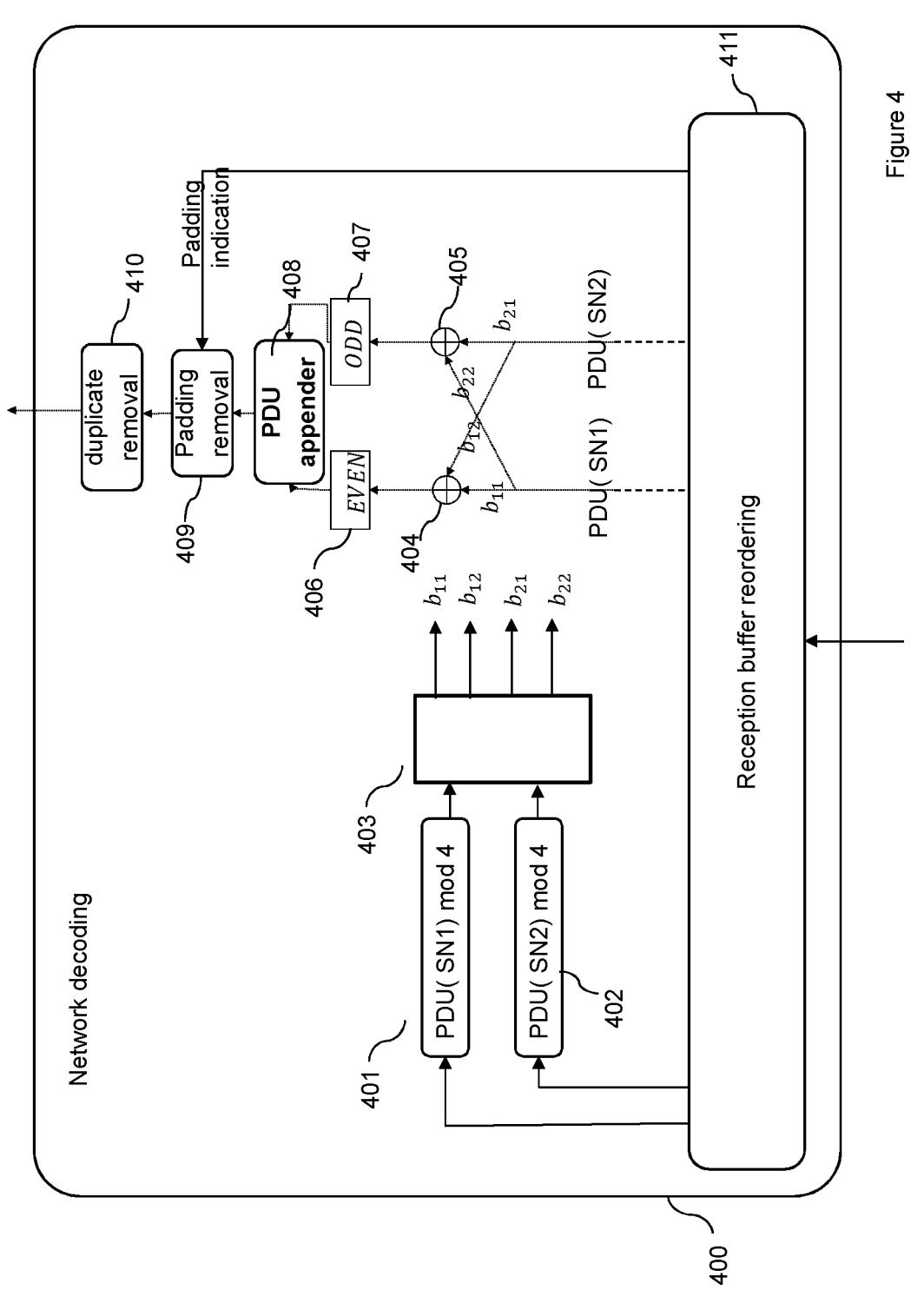
FIG. 4 illustrates an example of network coding scheme with the operations on the receiver side corresponding to the encoding operations depicted in FIG. 3.

FIG. 4 illustrates an example of network coding scheme with the operations on the receiver side corresponding to the encoding operations depicted in FIG. 3.

This example focuses on the decoding aspect of network coding, to be performed by a NC decoder module 400.

Each received encoded PDU (ODD, EVEN, COMB1, or COMB2) goes to reception buffer 411. Padding indication associated to the received PDU may be extracted and passed to the padding removal function 409. In reception buffer 411, the received PDUs may be reordered according to their sequence number. Any sequence number divided by 4 produces a quotient n and a remainder r. Any two PDUs sharing the same quotient n (i.e. any two out of EVEN, ODD, COMB1 and COMB2) are sufficient to reconstruct the original PDU. According to the remainders calculated in the modules 401 and 402 of any two received PDUs, a specific set of 4 coefficients ($b_{11}$, $b_{12}$, $b_{21}$ and $b_{22}$) is needed to reconstruct the packet. Example: if ODD and EVEN were received, the coefficients will be the identity matrix ($b_{11}$=1, $b_{12}$=0, $b_{21}$=0 and $b_{22}$=1).

The remainders out of module 401, also referred to as Rem(SN1), and out of module 402, also referred to as Rem(SN2), of any pair of received PDUs are thus the inputs of a lookup table 403.

Description of the Lookup Table 403:

Each byte of the 2 received encoded PDUs, respectively byte(SN1,$x$) and byte(SN2,$x$), x indicating the position of the byte in the packet, will form a vector $$\begin{pmatrix} \text{byte } (SN1, x) \\ \text{byte } (SN2, x) \end{pmatrix}.$$

This vector will be multiplied by a matrix M, the result being the 2 parts corresponding to the original PDU. 6 cases usually happen:

$1^{st}$ case) EVEN is received, ODD is received. Rem(SN1) =0 and Rem(SN2)=3, the matrix M is thus the identity matrix;

$2^{nd}$ case) EVEN is received, COMB1 is received. Rem (SN1)=0 and Rem(SN2)=1, the matrix M is the invert of $$\begin{pmatrix} 1 & 0 \\ \alpha_{1,1} & \alpha_{1,2} \end{pmatrix},$$

that is $$\begin{pmatrix} 1 & 0 \\ \alpha_{1,1}/\alpha_{1,2} & 1/\alpha_{1,2} \end{pmatrix},$$

$\alpha_{1,1}$ and $\alpha_{1,2}$ being the coefficients used by the encoding engine 303 of the transmitter, as described in FIG. 3;

$3^{rd}$ case) EVEN is received, COMB2 is received. Rem (SN1)=0 and Rem(SN2)=2, the matrix M is the invert of $$\begin{pmatrix} 1 & 0 \\ \alpha_{2,1} & \alpha_{2,2} \end{pmatrix}$$

that is $$\begin{pmatrix} 1 & 0 \\ \alpha_{2,1}/\alpha_{2,2} & 1/\alpha_{2,2} \end{pmatrix},$$

$\alpha_{2,1}$ and $\alpha_{2,2}$ being the coefficients used by the encoding engine 303;

$4^{th}$ case) ODD is received, COMB1 is received. Rem (SN1)=1 and Rem(SN2)=3, the matrix M is the invert of $$\begin{pmatrix} \alpha_{1,1} & \alpha_{1,2} \\ 0 & 1 \end{pmatrix}$$

that is $$\begin{pmatrix} 1/\alpha_{1,1} & \alpha_{1,2}/\alpha_{1,1} \\ 0 & 1 \end{pmatrix},$$

$\alpha_{1,1}$ and $\alpha_{1,2}$ being the coefficients used by the encoding engine 303;

5th case) ODD is received, COMB2 is received. Rem (SN1)=2 and Rem(SN2)=3, the matrix M is the invert of $$\begin{pmatrix} \alpha_{2,1} & \alpha_{2,2} \\ 0 & 1 \end{pmatrix}$$

that is $$\begin{pmatrix} 1/\alpha_{2,1} & \alpha_{2,2}/\alpha_{2,1} \\ 0 & 1 \end{pmatrix},$$

$\alpha_{2,1}$ and $\alpha_{2,2}$ being the coefficients used by the encoding engine 303;

$6^{th}$ case) COMB1 is received, COMB2 is received. Rem (SN1)=1 and Rem(SN2)=2, the matrix M is the invert of $$\begin{pmatrix} \alpha_{1,1} & \alpha_{1,2} \\ \alpha_{2,1} & \alpha_{2,2} \end{pmatrix}$$

that is $$\frac{1}{\alpha_{1,1}\alpha_{2,2} + \alpha_{2,1}\alpha_{1,2}} \begin{pmatrix} \alpha_{2,2} & \alpha_{1,2} \\ \alpha_{2,1} & \alpha_{1,1} \end{pmatrix},$$

$\alpha_{1,1}$, $\alpha_{1,2}$, $\alpha_{2,1}$ and $\alpha_{2,2}$ being the coefficients used by the encoding engine 303.

Though the probability of the following event is very low, it may happen that only one out of the 4 possible encoded PDUs is received. In such case, the process will not retrieve the original PDU which is lost (or a retransmission could be requested).

The matrices are given as a preferred choice as the decoding complexity is reduced thanks to the use of coefficients belonging to the set {0,1}. However, any choice of 4 pairs of linearly independent vectors would be acceptable. The matrix operations are performed by "multiply and add" units 404 and 405. The results are stored in buffers 406 and 407 before being appended by the module 408 to reconstruct the original PDU. Extra-padding may be removed in module 409. Finally, module 410 removes the duplicated PDUs, as it may happen that more than 2 encoded PDUs sharing the same quotient are received.

Figure 5:
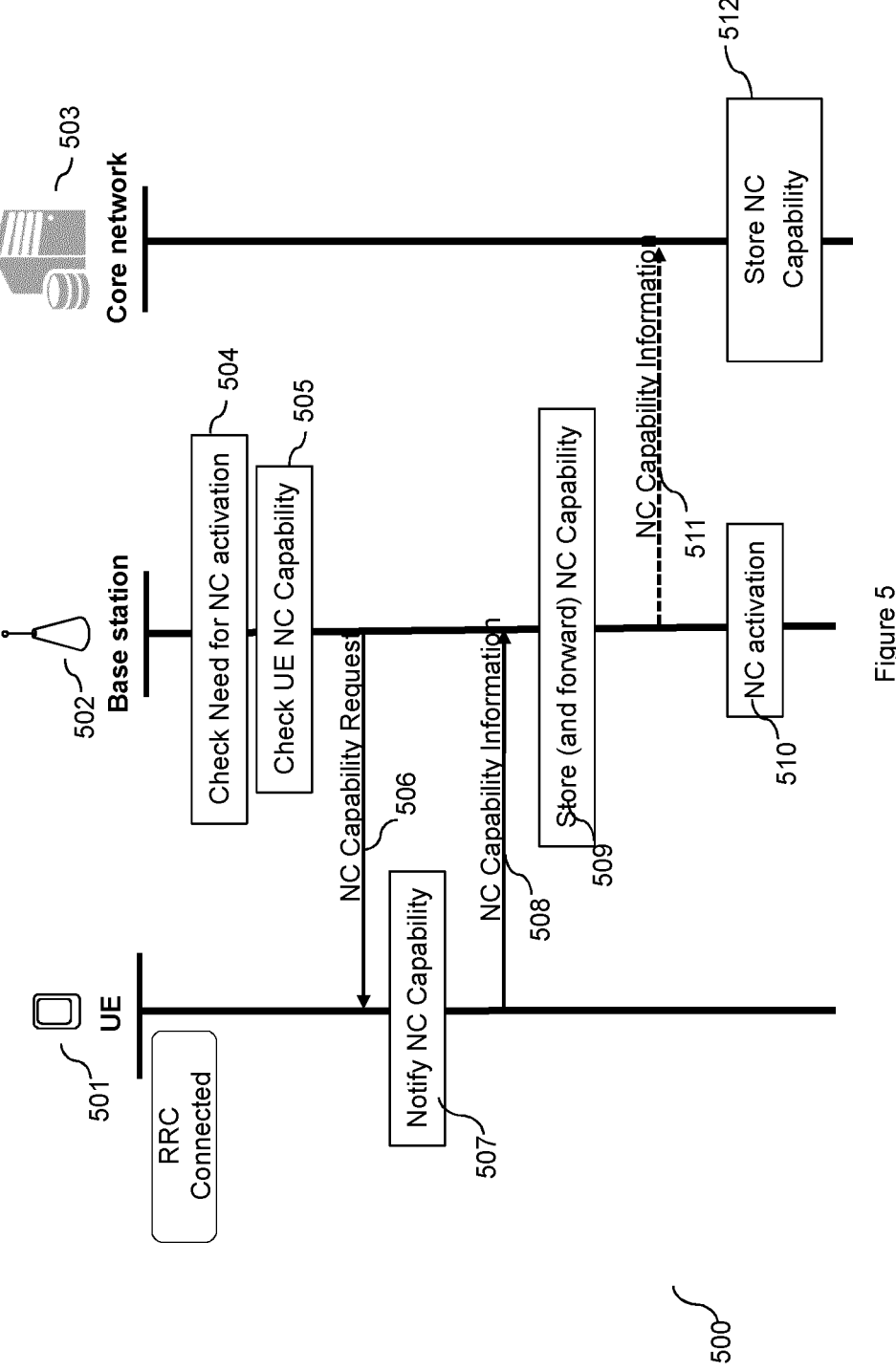
FIG. 5 illustrates an example of process flow that supports the indication of network coding (NC) capability according to an embodiment of the invention.

FIG. 5 illustrates an example of process flow 500 that supports the indication of network coding (NC) capability according to an embodiment of the invention. It assumes that UE 501 is in RRC connected state as defined in TS 38.331, meaning that UE 501 is connected to a base station 502 (which may be a gNB in a 5G NR network). The UE 501 may be registered in core network entity 503. In some embodiments of the invention, the core network is a 5G core network and core network entity 503 is the Access and Mobility Management Function (AMF), as defined in 3GPP standard TS 23.501.

According to embodiments of the invention, UE 501 refers to UE 101 of FIG. 1 or UE 201 of FIG. 2. According to another embodiment of the invention, base station 502 refers to base station 102 of FIG. 1 or base station 202-$a$ of FIG. 2.

At some point, base station 502 may require the capabilities of UE 501 and in particular its NC capability. It may be a systematic check once a UE is connected or registered. It may also be triggered when a data flow has to be transmitted to or received from UE 501. Then, base station 502 checks the need for NC activation at step 504. This requirement for applying network coding may be indicated by the level of Quality of Service (QoS) associated to the data flow. For instance, if the QoS level corresponds to a high reliability and a low latency requirement (like for URLLC), the NC shall be activated when both base station 502 and UE 501 support it.

Some further preliminary verifications are performed by the base station, to check that it actually supports NC (and which NC schemes are supported if several schemes are specified). In addition, base station 502 may check if Carrier Aggregation or multi-connectivity can be set-up.

After these first verifications, base station 502 needs to check the NC capability of UE 501 (step 505). For this purpose, a message 506 is sent to UE 501. In one embodiment of the invention, message 506 may be a generic request to UE 501 to provide its capabilities regarding all or part of the features defined in 5G NR. In another embodiment of the invention, message 506 may request UE 501 to provide its NC capability only. In another embodiment of the invention, a sub-set of capability features, such as but non-limited to Carrier Aggregation, Dual-Connectivity or PDCP duplication, may also be requested through message 506.

In one embodiment of the invention, message 506 is the RRC message called UECapabilityEnquiry and defined in the specification document TS 38.331 (version 16.0.0) for the RRC protocol in the control plane. It is transmitted through a signaling radio bearer previously established between base station 502 and UE 501 (on the primary cell in CA or DC, i.e. the cell associated to the base station where the control protocol resides).

Through message 506, UE 501 receives the request to notify its NC capability, optionally with other capability features. In step 507, UE 501 checks its internal parameters, and formats the response to be sent to base station 502. The response is message 508, which contains the NC capability information. In one embodiment of the invention, message 508 is the RRC message called UECapabilityInformation and defined in the specification document TS 38.331 (version 16.0.0).

In response to the reception of message 508, in step 509, base station 502 stores the capabilities of UE 501, including Network Coding capabilities, in an internal memory (e.g. RAM). In one embodiment of the invention, in step 509, base station 502 may decide to forward the UE capability information to core network entity 503 by sending NC Capability Information message 511.

In step 512, core network entity 503 stores the received NC capability information. The benefit is to allow, for instance, a base station to further retrieve the NC capability information without consuming the radio access network (RAN) bandwidth. Message 511 may be the NGAP (Next Generation Application Protocol) message, called UE RADIO CAPABILITY INFO INDICATION, and described in TS 38.413 (version 16.1.0).

In step 510, base station 502 may decide to activate a NC scheme supported by both the base station and the UE for the data flows to be transmitted to or received from UE 501.

In one embodiment of the invention, base station 502 may repeat the process of sending NC capability request 506, receiving NC capability information 508, storing NC Capability Information (step 509) and forwarding NC capability information several times before entering NC activation step 510.

Figure 6:
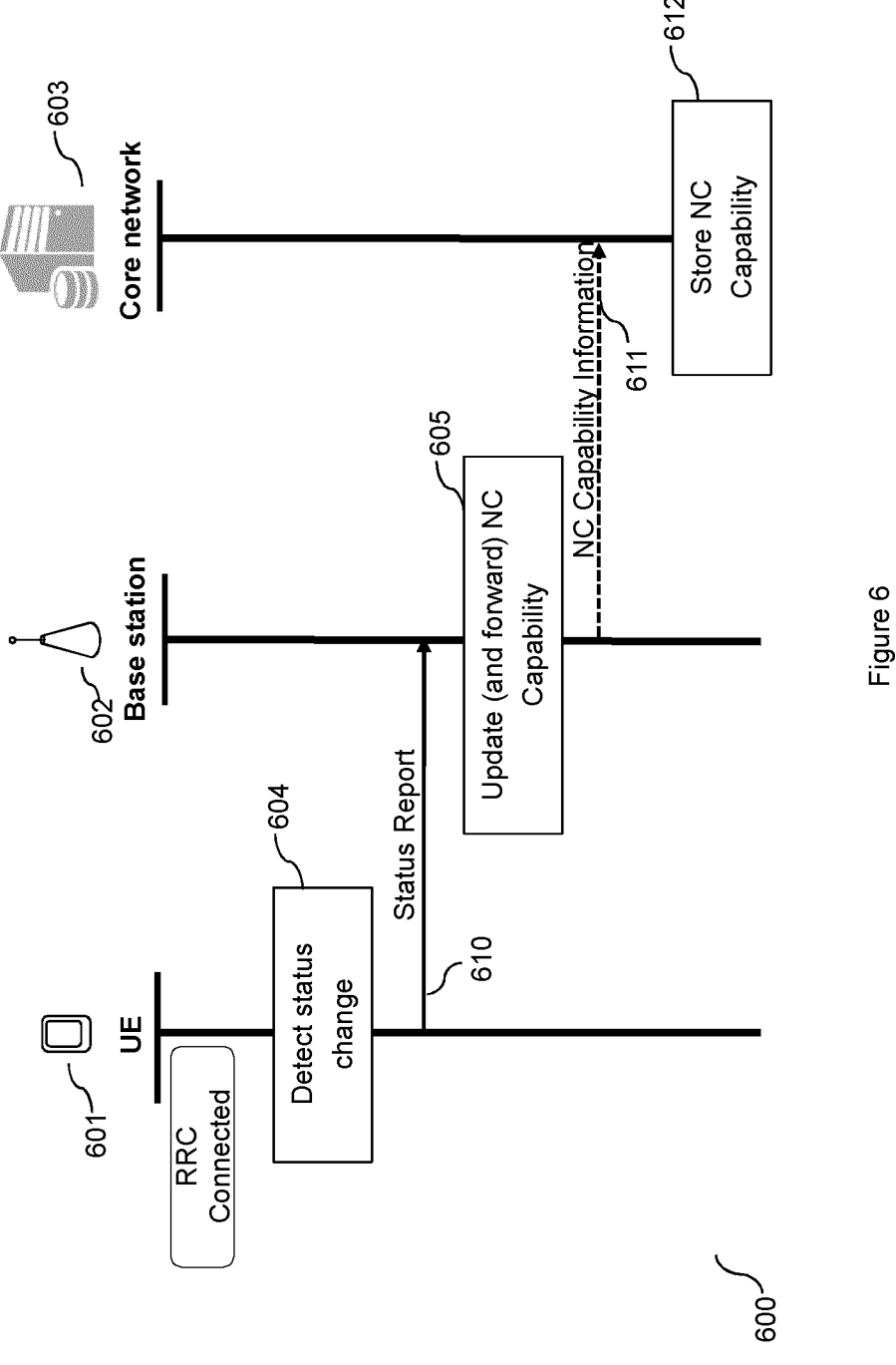
FIG. 6 illustrates an example of process flow that supports the update of NC capability initiated by a UE according to an embodiment of the invention.

FIG. 6 illustrates an example of process flow 600 that supports the update of NC capability initiated by a UE according to an embodiment of the invention.

It assumes that UE 601 is in RRC connected state as defined in TS 38.331, meaning that UE 601 is connected to base station 602 (which is a gNB in a 5G NR network). UE 601 may be registered in core network entity 603. It is also assumed that UE 601 has already provided its NC capability according to the process flow described in FIG. 5 of the present document.

In one embodiment of the invention, the core network is a 5G core network and core network entity 603 is the Access and Mobility Management Function (AMF), as defined in 3GPP standard TS 23.501.

According to one embodiment of the invention, UE 601 refers to UE 101 of FIG. 1 or UE 201 of FIG. 2. According to another embodiment of the invention, base station 602 refers to base station 102 of FIG. 1 or base station 202-*a* of FIG. 2.

At some point (step 604), UE 601 may detect some changes in its internal parameters that may need to be communicated to the base station 602. For instance, the CPU load of UE 601 may be high with an overheating situation preventing the UE from supporting NC anymore. This overheating status may be communicated to base station 602 through message 610 in the form of a status report. This message 610 may be the RRC message UEAssistanceInformation described in TS 38.331 (version 16.0.0). Another example is a failure detected in the communication in the Secondary Cell Group (SCG) in case of Dual connectivity. Such failure may be reported within the RRC message SCGFailureInformation described in TS 38.331 (version 16.0.0). As an alternative, the RRC message Mesuremen-tReport described in TS 38.331 (version 16.0.0) may be used to report the UE status.

In response to the reception of message 610, base station 702 can interpret the status information and may decide to update the NC capability information of UE 601 stored in its internal memory (step 605). In one embodiment of the invention, following step 605, base station 602 forwards the NC capability information to core network entity 603 by sending message 611. In step 612, core network entity 603 stores the updated NC capability information. Message 611 may be the NGAP message UE RADIO CAPABILITY INFO INDICATION described in TS 38.413 (version 16.1.0).

Figure 7:
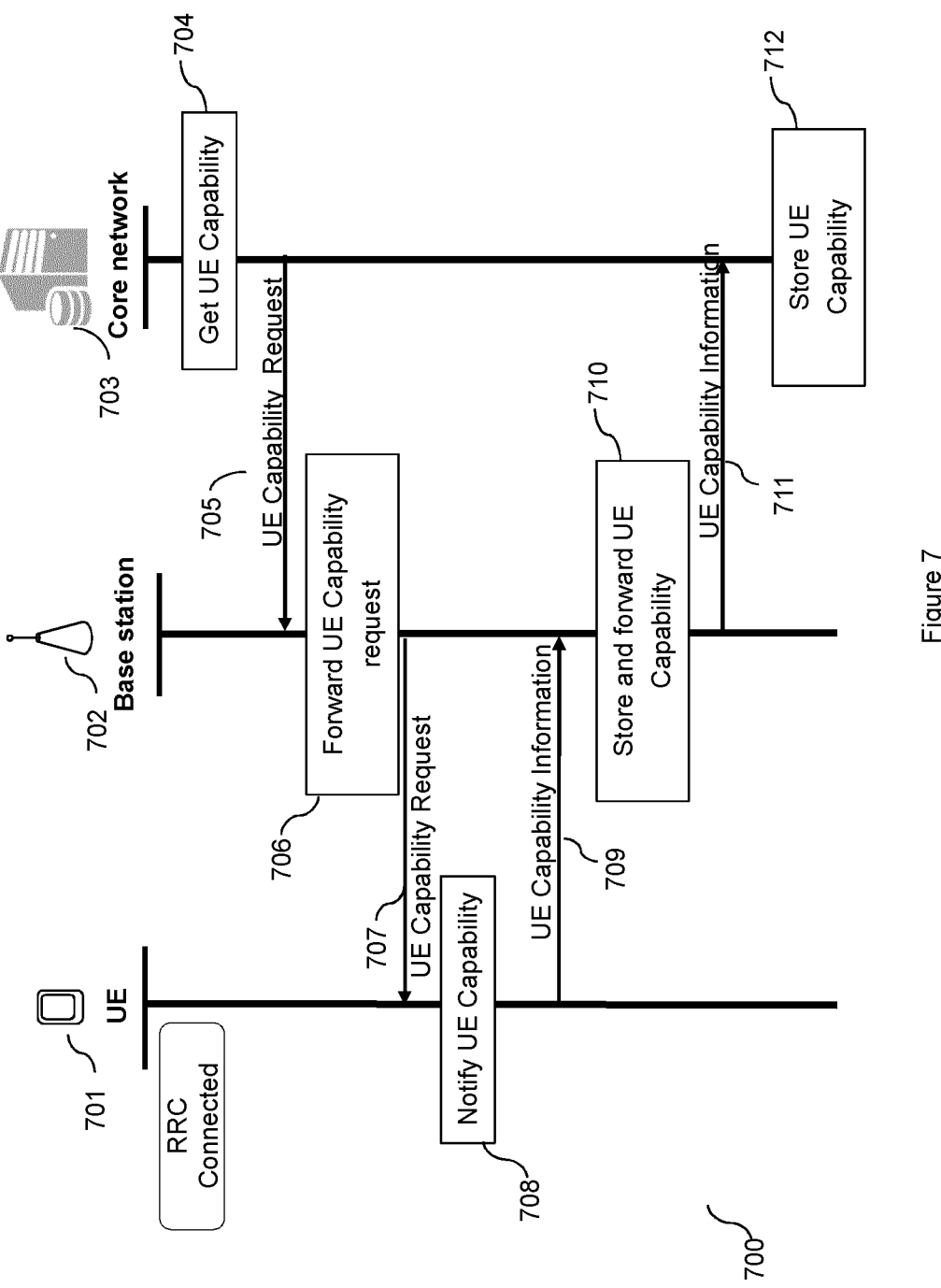
FIG. 7 illustrates an example of process flow that supports the indication of NC capability upon a request of the core network according to an embodiment of the invention.

FIG. 7 illustrates an example of process flow 700 that supports the indication of NC capability upon a request of the core network according to an embodiment of the invention. It assumes that UE 701 is in RRC connected state as defined in TS 38.331, meaning that UE 701 is connected to a base station 702 (which is a gNB in a 5G NR network). UE 701 is also registered at core network entity 703 (e.g. the 5G Core).

In one embodiment of the invention, the core network is a 5G core network and core network entity 703 is the Access and Mobility Management Function (AMF), as defined in 3GPP standard TS 23.501.

According to one embodiment of the invention, UE 701 refers to UE 101 of FIG. 1 or UE 201 of FIG. 2. According to another embodiment of the invention, base station 702 refers to base station 102 of FIG. 1 or base station 202-*a* of FIG. 2.

At some point, at step 704, core network entity 703 may need to get the overall capabilities of UE 701. This information can be sufficiently large that it is undesirable to send it across the radio interface at every state transitions. There is therefore an advantage to store the UE capabilities in the core network to allow, for instance, a base station to retrieve them without consuming the radio bandwidth. For this purpose core network entity 703 sends UE Capability Request message 705 to the base station 702. This message 704 is a request to get the capabilities of the registered UE 701.

In response to the reception of message 705, base station 702 forwards the request at step 706, by sending UE Capability Request message 707 to the UE. In response to the reception of message 707, the UE notifies its capabilities at step 708 by sending UE Capability Information message 709 to the UE. Message 709 includes the network coding parameters as described in FIG. 5. After receiving message 709, at step 710, base station 702 may store the UE capabilities in a local memory, and then forward the UE capability information to the core network entity 703 by sending UE Capability Information message 711.

Finally, at step 712, the core network 703 stores the received UE capability information.

As example, the messages 705, 707, 709, 711 may be standardized messages described in TS 38.413 (version 16.1.0) and TS 38.331 (version 16.0.0). More precisely, the message 705 may be the NGAP message UE RADIO CAPABILITY CHECK REQUEST, and the message 711 may be composed of the NGAP (Next Generation Application Protocol) message UE RADIO CAPABILITY CHECK RESPONSE. The message 707 may be the RRC message UECapabilityEnquiry and the message 709 may be the RRC message UECapabilityInformation.

Figure 8:
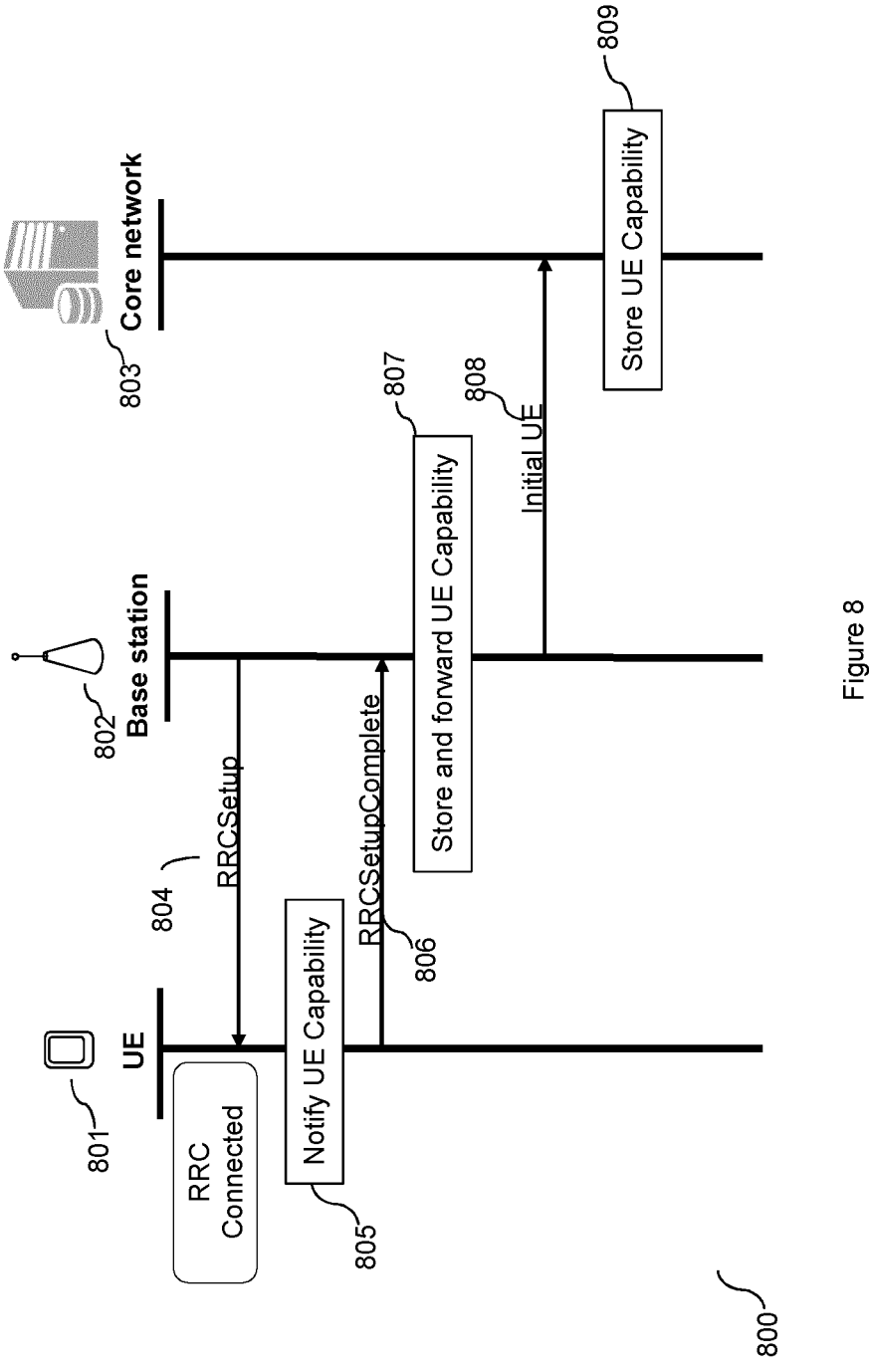
FIG. 8 illustrates an example of process flow that supports the indication of NC capability during the initialization phase of a UE according to an embodiment of the invention.

FIG. 8 illustrates an example of process flow 800 that supports the indication of NC capability during the initial- In one embodiment of the invention, the core network is a 5G core network and core network entity 803 is the Access and Mobility Management Function (AMF), as defined in 3GPP standard TS 23.501.

According to one embodiment of the invention, UE 801 refers to UE 101 of FIG. 1 or UE 201 of FIG. 2. According to another embodiment of the invention, base station 802 refers to base station 102 of FIG. 1 or base station 202-*a* of FIG. 2.

In response to RRCSetup message 804, at step 805, UE 801 formats a message, for example the RRC message 806 called RRCSetupComplete. RRCSetupComplete message 806 includes a Registration Request in the dedicated NAS-Message field (NAS stands for Non Access Stratum). As described in the specifications document TS 24.501, the Registration Request includes a UE radio capability ID which is described in the specifications document TS 23.003. This UE radio capability ID may include information relative to the NC capabilities of UE 801.

Upon reception of RRCSetupComplete message 806, at step 807, base station 802 forwards the Registration Request into a message, for example Initial UE message 808, sent to core network entity 803. Initial UE message 808 is described in the specifications document TS 38.413 edited by 3GPP. At step 807, base station 802 may also store the received UE capability information. At step 809, core network entity 803 may processes the Registration Request from UE 801 and store the received UE capability information.

Following is an illustration of NC Capability Information, in relation with messages 508, 511 of FIG. 5, message 611 of FIG. 6, messages 709 and 711 of FIG. 7 and messages 806 and 808 of FIG. 8 according to one embodiment of the invention where this information is part of the RRC message UECapabilityInformation. The NC capability information (in bold below) may be added in the information element called PDCP-parameters contained in the information element called UE-NR-Capability:

```
UECapabilityInformation ::=          SEQUENCE {
    rrc-TransactionIdentifier            RRC-TransactionIdentifier,
    criticalExtensions                   CHOICE {
        ueCapabilityInformation             UECapabilityInformation-IEs,
        criticalExtensionsFuture            SEQUENCE { }
    }
}
UECapabilityInformation-IEs ::=      SEQUENCE {
    ue-CapabilityRAT-ContainerList       UE-CapabilityRAT-ContainerList
OPTIONAL,
    lateNonCriticalExtension             OCTET STRING
OPTIONAL,
    nonCriticalExtension                 SEQUENCE{ }
OPTIONAL
}
UE-CapabilityRAT-ContainerList ::=   SEQUENCE (SIZE (0..maxRAT-CapabilityContainers)) OF
                                         UE-CapabilityRAT-Container
UE-CapabilityRAT-Container ::=       SEQUENCE {
    rat-Type                             RAT-Type,
    ue-CapabilityRAT-Container           OCTET STRING
}
``` ization phase of a UE 801 according to an embodiment of the invention. It assumes that UE 801 has just entered in the RRC connected state as defined in TS 38.331. UE 801 is not yet registered in the core network 803.

ue-CapabilityRAT-Container: Container for the UE capabilities of the indicated RAT (Radio Access Technology). For rat-Type set to NR: the encoding of UE capabilities is defined in UE-NR-Capability information element

```
UE-NR-Capability ::=                    SEQUENCE {
   accessStratumRelease                    AccessStratumRelease,
   pdcp-Parameters                         PDCP-Parameters,
   rlc-Paxameters                          RLC-Parameters             OPTIONAL,
   mac-Paxametexs                          MAC-Parameters             OPTIONAL,
   phy-Parameters                          Phy-Parameters,
   rf-Parameters                           RF-Parameters,
   measAndMobParameters                    MeasAndMobParameters       OPTIONAL,
   fdd-Add-UE-NR-Capabilities              UE-NR-CapabilityAddXDD-Mode  OPTIONAL,
   tdd-Add-UE-NR-Capabilities              UE-NR-CapabilityAddXDD-Mode  OPTIONAL,
   fr1-Add-UE-NR-Capabilities              UE-NR-CapabilityAddFRX-Mode  OPTIONAL,
   fr2-Add-UE-NR-Capabilities              UE-NR-CapabilityAddFRX-Mode  OPTIONAL,
   featureSets                             FeatureSets                OPTIONAL,
   featureSetCombinations                  SEQUENCE (SIZE (1..maxFeatureSetCombinations))OF
                                           FeatureSetCombination      OPTIONAL,
   lateNonCriticalExtenslon                OCTET STRING               OPTIONAL,
   nonCriticalExtension                    UE-NR-Capability-v1530     OPTIONAL
}
PDCP-Parameters ::=                     SEQUENCE {
   supportedROHC-Profiles                  SEQUENCE {
      profile0x0000                           BOOLEAN,
      profile0x0001                           BOOLEAN,
      profile0x0002                           BOOLEAN,
      profile0x0003                           BOOLEAN,
      profile0x0004                           BOOLEAN,
      profile0x0006                           BOOLEAN,
      profile0x0101                           BOOLEAN,
      profile0x0102                           BOOLEAN,
      profile0x0103                           BOOLEAN,
      profile0x0104                           BOOLEAN
   },
   maxNumberROHC-ContextSessions           ENUMERATED {cs2, cs4, cs8, cs12, cs16, cs24,
                                              cs32, cs48,cs64,cs128, cs256, cs512,
                                              cs1024, cs16384, spare2, spare1},
   uplinkOnlyROHC-Profiles                 ENUMERATED {supported}     OPTIONAL,
   continueROHC-Context                    ENUMERATED {supported}     OPTIONAL,
   outOfOrderDelivery                      ENUMERATED {supported}     OPTIONAL,
   shortSN                                 ENUMERATED {supported}     OPTIONAL,
   pdcp-DuplicationSRB                     ENUMERATED {supported}     OPTIONAL,
   pdcp-DuplicationMCG-OrSCG-ORB           ENUMERATED {supported}     OPTIONAL,
   nc-Capability                           ENUMERATED {downlink, uplink,
                                              both, none}             OPTIONAL,
      nc-Scheme1                              SEQUENCE {              OPTIONAL,
      nc-Scheme1                                 BOOLEAN,
      nc-Scheme2                                 BOOLEAN,
      nc-Scheme3                                 BOOLEAN,
      nc-Scheme4                                 BOOLEAN,
      nc-Scheme5                                 BOOLEAN,
      nc-Scheme6                                 BOOLEAN
   }
   nc-MaxNumFlow                           INTEGER (1..16)            OPTIONAL,
   nc-Restrictions                         ENUMERATED {res1, res2, spare2, spare1}OPTIONAL,
   ...
}
```

In this example, the NC capability information parameters are composed of:

nc-Capability: a value out of 4 possible values indicating if the UE is ready to activate NC for downlink (DL) only (decoding), for uplink (UL) only (encoding), for both downlink (DL) and uplink (UL), or none of the links;

nc-Scheme: a bit string where each bit (Boolean) is associated to one NC scheme to indicate if the NC scheme is supported or not. A bit value '0' means that the associated NC scheme is not supported. This format assumes that both the base station and the UE are sharing the same understanding of which NC scheme corresponds to each bit.

nc-MaxNumFlow: an integer number indicating the maximum number of network coded flows that can be simultaneously processed by the UE. With this indication, the base station will know if an additional data flow transmitted or received by the UE can be network coded or not;

nc-Restrictions: a value out of a plurality of possible values indicating the reason why the NC may not be supported (i.e. when the nc-Capability is set to none). With this indication, the base station can understand that the UE may recover NC capability later. In one embodiment of the invention, possible restrictions may include low level of UE's battery, or high processing load in the UE.

This is a non-limitative example, other formats and combinations of parameters are possible. Some variants are proposed here after:

The nc-Capability parameter may be reduced to a single Boolean, and it may be included in nc-Schemes: if all the Booleans are false, it means that NC is not supported.

The nc-Capability parameter may be extended specifying if NC is supported through Carrier Aggregation (CA), or Dual Connectivity (DC), or Multi-connectivity (through several SCG).

The support of NC may be conditioned by the support of PDCP duplication. In TS 38.306 (version 16.0.0), the parameter called pdcp-DuplicationMCG-OrSCG-DRB is used to indicate whether the UE supports CA-based PDCP duplication over MCG or SCG Data Radio Bearer (DRB), and the parameter pdcp-Duplication-SplitDRB indicates whether the UE supports PDCP duplication over split DRB.

nc-Restrictions may alternatively be a list of conditions to perform NC in the UE, for instance if the battery level is not too low or if the processing load is not too high. In that case, the parameter nc-MaxNumFlow may be included in this list of restrictions.

All parameters may be gathered in a code corresponding to a class of service available in the UE.

As specified in TS 38.331 (version 16.0.0), for rat-Type set to eutra-nr, the encoding of UE capabilities is defined in UE-MRDC-Capability information element which contains the information element PDCP-ParametersMRDC where the NC capability information may be added. In such case, the UE may support DC through a 4G/LTE base station and a 5G NR base station.

Also, for rat-Type set to eutra (4G/LTE), the encoding of UE capabilities is defined in UE-EUTRA-Capability information element specified in TS 36.331, the RRC specifications document for 4G/LTE. The information element UE-EUTRA-Capability contains the information element PDCP-Parameters where the NC capability information may be added.

The reason to place the NC capability parameters within the PDCP parameters is that the encoding and decoding operations may advantageously be performed in the PDCP (Packet Data Convergence Protocol) layer of the user data plane. Indeed, this is the place where each PDU to transmit is mapped to one of the available transmission channels or data radio bearers (DRB) as described in 3GPP standard TS 38.323. Especially in DC, this is the place where the split bearer is instantiated to enable the transmission through the secondary base station.

Figure 9:
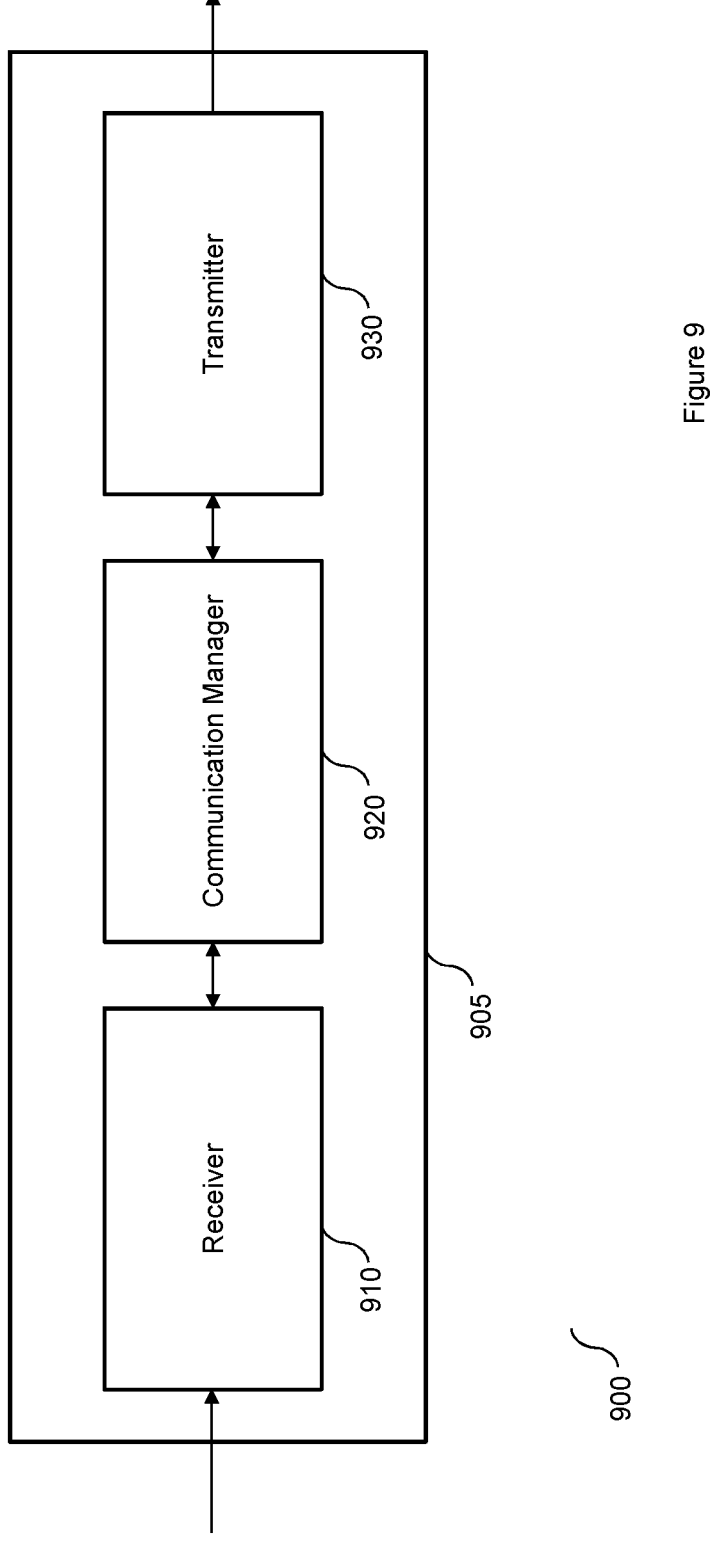
FIG. 9 illustrates a block diagram of a device that supports Network Coding according to an embodiment of the invention.

FIG. 9 illustrates a block diagram 900 of a device 905 that supports Network Coding according to an embodiment of the invention. Device 905 may be an example of UE 101 or of base station 102 in relation with FIG. 1 or FIG. 2. Device 905 comprises a Receiver 910, a Communication Manager 920 and a Transmitter 930. Each of these elements may be in communication with each other through one or more electronic buses.

The receiver 910 receives both user plane and control plane packets, but may also receive synchronization signals. It may also receive specific signals for connection establishment purpose. Receiver 910 may receive signals used for measurements or paging purpose.

Figure 11:
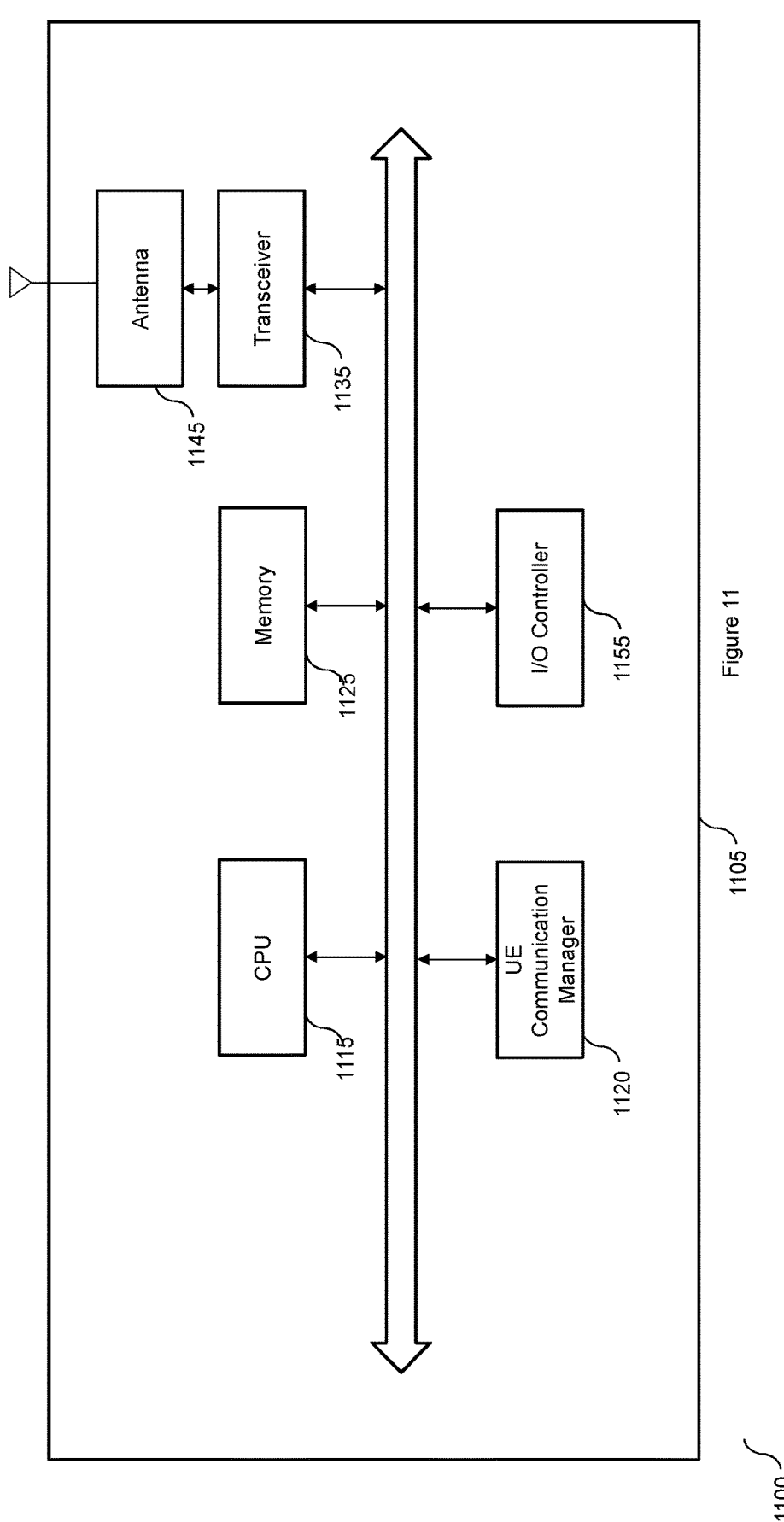
FIG. 11 illustrates a block diagram of a UE that supports Network Coding.
Figure 12:
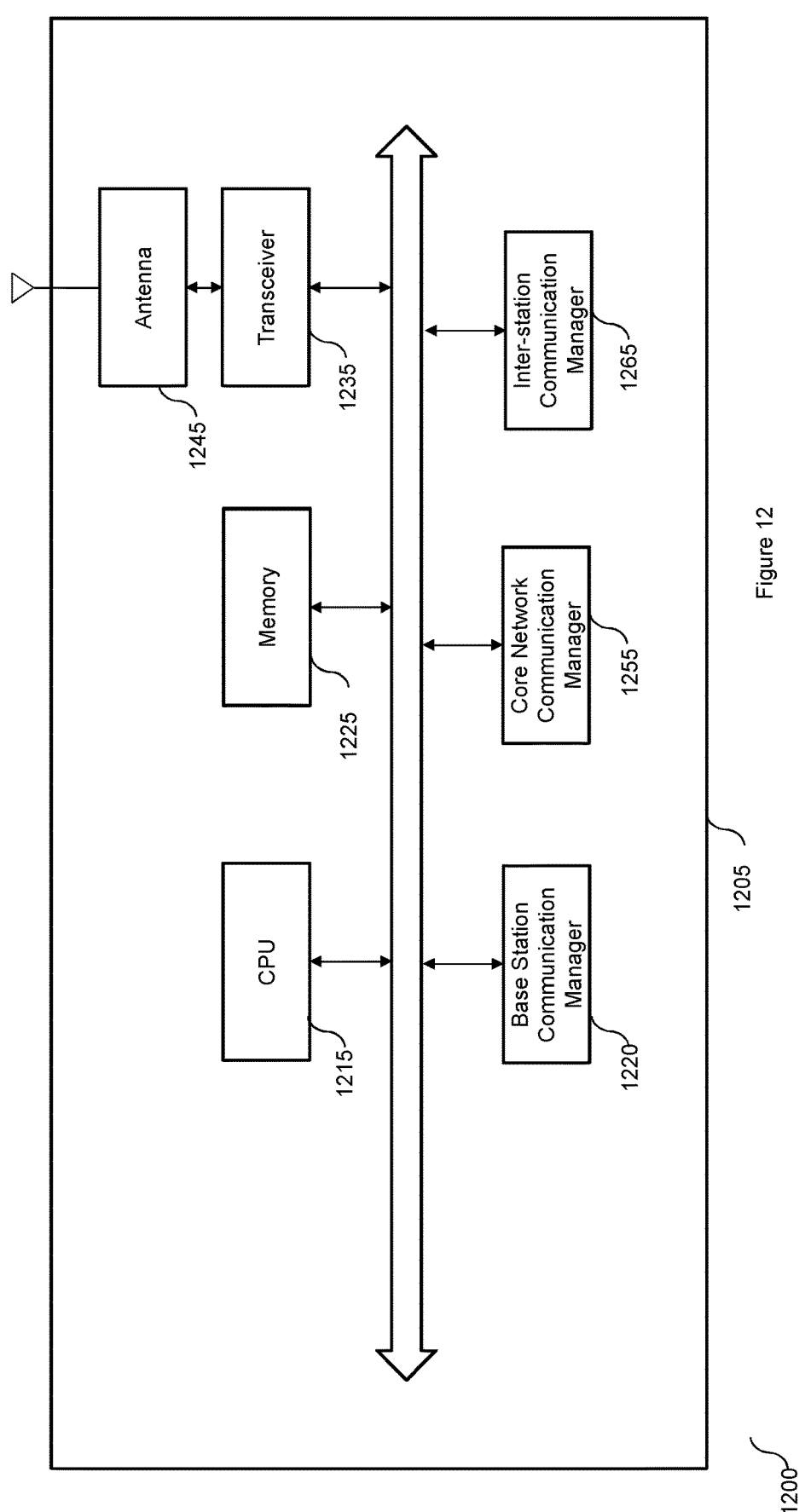
FIG. 12 illustrates a block diagram of a Base Station that supports Network Coding.

Receiver 910 may refer to all or part of transceiver 1135 as described in FIG. 11 or transceiver 1235 as described in FIG. 12.

In one embodiment of the invention, the receiver 905 may receive packets encoded with a network coding scheme, in relation with FIG. 3 and FIG. 4.

The Communication Manager is responsible for the establishment, the control and the release of a communication. The Communication Manager 920 functions may be distributed and not necessarily resident in a same physical location.

In one embodiment of the invention, the Communication Manager 920 manages all or part of the following aspects, in relation with FIGS. 5 to 8: Network Coding capability request, Network Coding capability indication, Network Coding activation and Network Coding deactivation.

The Transmitter 930 transmits both user plane and control plane packets, as well as synchronization signals, measurement signals, paging signals and signals specific to the initiation of a connection.

The Transmitter 930 may refer to all or part of transceiver 1135 as described in FIG. 11 or transceiver 1235 as described in FIG. 12.

In one embodiment of the invention, the Transmitter 930 may transmit packets encoded with a network coding scheme, in relation with FIG. 3 and FIG. 4.

Hardware, software and firmware can be used to implement the elements of device 905. Hardware here includes CPUs, FPGAs, Application Specific Integrated Circuits as well as DSPs, GPUs, and discrete elements electronic, either logic or analog, or any combination of these means. When an element is virtualized, i.e. the function is implemented by the execution of a programmatic code, such code may be executed in a single or in parallel threads, upon a CPU, a DSP or a GPU, or even on a remote generic server. Communications between elements can be made by wires, buses or even optical fiber, or by memory buffers if the element is virtualized. The elements may be localized together or distributed in various places, even remote.

Figure 10:
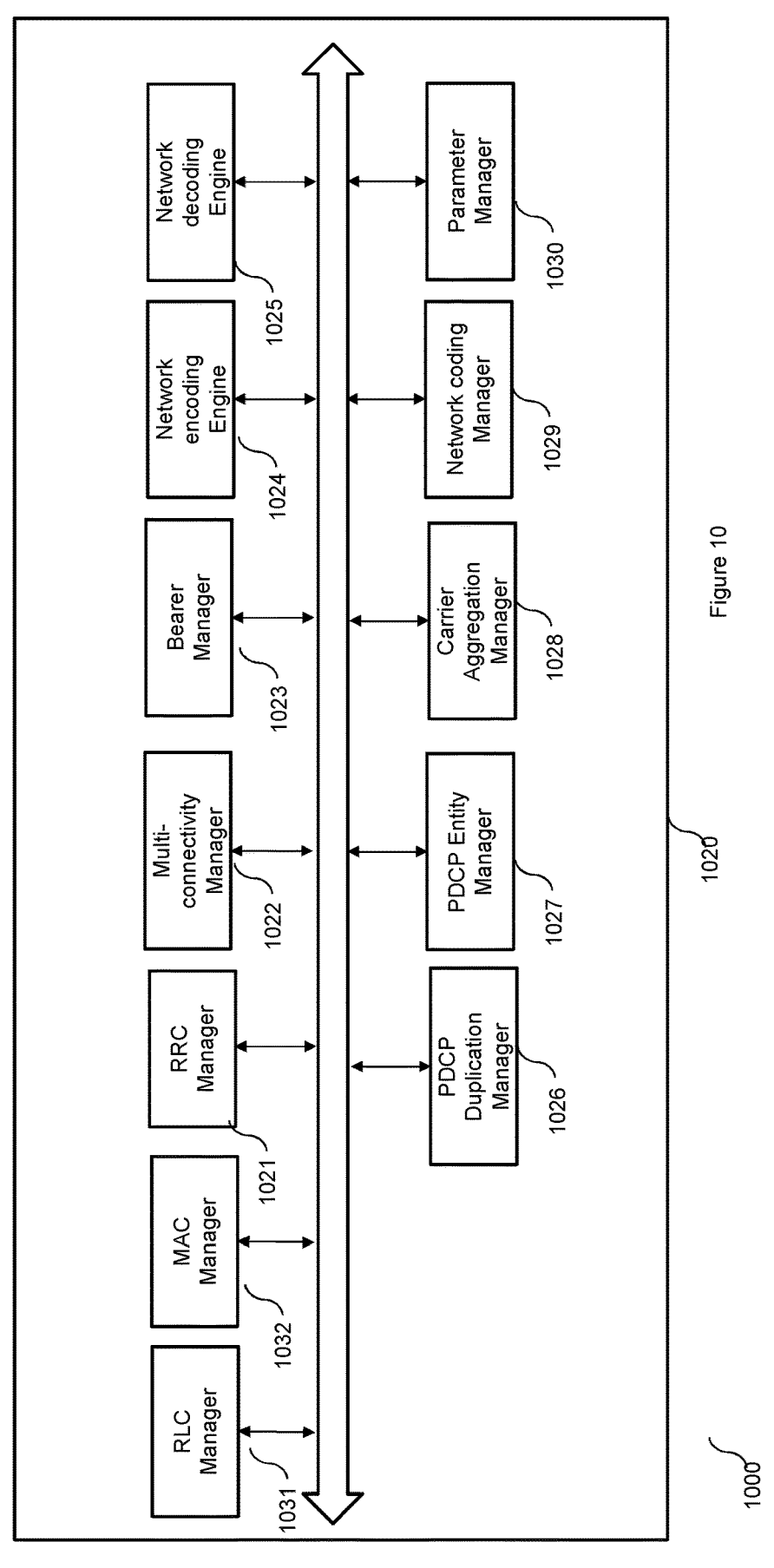
FIG. 10 illustrates a block diagram of a Communication Manager that supports Network Coding according to an embodiment of the invention.

FIG. 10 illustrates a block diagram of a Communication Manager 1020 that supports Network Coding according to an embodiment of the invention. It is a non-limitative example of the Communication Manager 920. The Communication Manager operates several protocols, common to both ends of a wireless communication.

Communication Manager 1020 includes an RRC Manager 1021, a Multi Connection Manager 1022, a Bearer Manager 1023, a Network Encoding Engine 1024, a Network Decoding Engine 1025, a PDCP Duplication Manager 1026, a PDCP Entity Manager 1027, a Carrier Aggregation Manager 1028, a Network Coding Manager 1029, a Parameter Manager 1030, an RLC Manager 1031, and a MAC Manager 1032. Each of those elements can communicate with each other. The Network Decoding Engine 1025 implements the function described in FIG. 4. Network Encoding Engine 1024 implements the function described in FIG. 3. The Network Coding Manager is responsible for the set-up and release of Network Decoding Engine 1025 and Network Encoding Engine 1024.

Carrier Aggregation Manager 1128 establishes or releases the use of more than one bandwidth part between the Base Station and the UE. The Carrier Aggregation Manager has action upon the RLC layers and activates both a principal RLC and a secondary RLC if carrier aggregation is activated. In operation without Network Coding or without PDCP duplication, it behaves like a switch and activates alternatively a first RLC Layer and a second RLC layer.

Multi-Connectivity Manager 1022 establishes or releases the use of more than one bandwidth part between two Base Stations and the UE. The Multi-Connectivity Manager 1022 has action upon the RLC layers. It activates both a principal RLC and a secondary RLC if multi connection is activated, for user data, or just the principal if multi-connection is not activated.

RRC Manager 1021 handles the RRC protocol Engine. In a UE, the RRC Manager 1021 uses the NC capability parameters stored in the Parameter Manager 1030 and pilots the RRC Protocol engine so that the latter encodes the parameters following the ASN.1 specification before sending them. In a Base Station (BS), the RRC protocol Engine decodes the received messages following the ASN.1 specification and extracts the parameters for NC capability received from the UE.

PDCP Duplication Manager 1026 handles and releases the use of more than one RLC for a flow of data. It behaves like a repeater in sending the same packet to the multiple RLC layers when duplication is enabled.

PDCP Entity Manager 1027 in the context of this invention handles the PDCP layer. A packet may or may not need header compression, or ciphering or integrity. The PDCP Entity Manager 1027 enables/disables these features. If Network Coding is enabled, it selects the specific header corresponding to the Network Coding.

Bearer Manager 1023 handles the mapping of data flows to Data Radio Bearers (DRBs). In 5G NR, a DRB corresponds to the use of resources implementing the protocols (PDCP, RLC, MAC) and the PHY layer. A DRB may carry several data flows if they belong to the same class of Quality of Service (QoS). Bearer Manager 1023 may enable the Network Coding operations if the packet belongs to the user data plane (and always disables the Network Coding operations if the packet belongs to the control plane).

Network Coding Manager 1029 handles the Network encoding Engine 1024 and the Network Decoding Engine 1025. It sets the Network Coding parameters when required. The parameters may be stored into the device, or in the Core Network. Network Coding Manager 1029 enables/disables Network encoding Engine 1024 and/or Network Decoding Engine 1025, according to the UE capabilities.

RLC Manager 1031 handles the RLC layer. It may enable more than one RLC modules if the device is in Carrier Aggregation or in Dual Connectivity.

MAC Manager 1032 handles the MAC Layer(s). It may enable more than one MAC modules if the device is in Dual Connectivity, and the device is a UE.

FIG. 11 illustrates a block diagram 1100 of a UE that supports Network Coding according to embodiments of the invention. The device includes components for transmitting and receiving communications, including a UE Communication Manager 1120, an I/O controller 1155, a Transceiver 1135, one or more antennas 1145, Memory 1125, and a Processor 1115. All these elements communicate with each other.

Memory 1125 includes RAM, ROM, or combination of both or as a non-limitative example a mass storage device such as a disk or a Solid-State Drive. Basic Input Output System (BIOS) Instructions may be stored within the Memory.

The processor 1145 is configured to execute machine readable instructions. Execution of these machine-readable instructions causes the device to perform various functions. These functions may be related to transmission, (and in particular to Network Coding) or to interaction with peripheral devices like for instance a keyboard, a screen, a mouse, etc. The processor may run an operating system like for instance, iOS, windows, Android, etc.

The I/O Controller 1155 allows these interactions with external peripherals by providing the hardware required and by managing input and output signals.

The transceiver 1135 communicates bi-directionally in wireless with other wireless devices. It provides the necessary modems and frequency shifters necessary to connect to Wi-Fi, Bluetooth, LTE, 5G NR, etc.

The communications go through sets of one or many antennas adapted to the spectrum of the frequency transposed signals, issued from the baseband modems. Each antenna set may be limited to one antenna, but preferably it contains several antennas, in order to provide beam forming capability.

UE Communication Manager 1120 handles the communication establishment of the UE to a Radio Access Network, its control and its release. In one embodiment of the invention, UE Communication Manager 1120 refers to any one of communication manager 920, 1020 or 1220.

The UE receives from the Base Station an indication of slots available for its transmission. It then knows where in time and frequency it expects incoming data or must send its outgoing data, whether they belong to the control or data plane. In particular, it may transmit (upon request received from the Base Station) to the Base Station parameters indicating the UE capability to execute Network Coding and Decoding, in Uplink and Downlink. In one embodiment of the invention, this is achieved according to process flows of FIG. 5, FIG. 6, FIG. 7, or FIG. 8.

It must be noted that this capability may be attached to a model or a class of UE. For smartphones, a few models are popular and form several large groups of identical devices having identical features. For IIOT devices, it might be expected that devices will be standardized and present identical features even if coming from different manufacturers, forming classes of devices. The UE may indicate to the requesting Base Station it is such model or it belongs to such class, instead of presenting its whole set of capabilities, per example at the same time it registers with its subscriber Identity to the network. The set of capabilities would be pre-stored in a memory of the core network by an action of the manufacturer, or would be collected from the UE the first time a class representative UE registers into the Core Network. Upon receiving a new subscriber identity for registration, (by a message coming from the UE and being relayed by the Base Station), the Core Network may download the UE capabilities to the Base Station.

FIG. 12 illustrates a block diagram 1200 of a Base Station that supports Network Coding according to embodiments of the invention. The Base Station device 1205 includes components for transmitting and receiving communications, including a Base Station Communication Manager 1220, a Core Network Communication Manager 1255, a Transceiver 1235, one or many antennas 1245, Memory 1225, a Processor 1215, and an Inter Station Communication Manager 1265. All these elements communicate with each other.

The Base Station Communication Manager 1220 handles the communications with a plurality of UEs. It is responsible for the establishment, the control and the release of these communications. In particular, it may request from a UE its capability. Upon reception of the response, it may store the Network Coding Capability locally. The Base Station Communication Manager 1220 sends the UE capabilities to the Core Network Communication Manager 1255. The Base Station Communication Manager 1220 includes a scheduler. The scheduler allocates time frequency slots to the different UE communications. An information regarding the schedule of occupation of these slots is sent to all active UEs.

The Core Network Communication Manager 1255 manages communications of the Base Station with the core network. In particular it will be responsible for sending to the core network the UE capabilities. These capabilities will be stored by the core network.

The Transceiver 1235 communicates bi directionally in wireless with other wireless devices. These devices may be UEs, or even other Base Stations. The transceiver provides the necessary modems and frequency shifters in order to connect to a large number of UEs simultaneously, using different frequency carriers, in Time Division Duplex (TDD)

or in Frequency Division Duplex (FDD). The transceiver may provide MIMO coding. The transceiver is connected to antennas.

The antenna set may be limited to one antenna, but preferably it contains several antennas, in order to provide beam forming capability.

Memory 1225 includes RAM, ROM, or combination of both or as a non-limitative example a mass storage device such as a disk or a Solid-State Drive. BIOS Instructions may be stored within the Memory to support an operating system.

The processor 1215 executes computer readable instructions performing various functions, for instance the functions related to the Network Coding.

The interstation communication manager 1265 manages communications with other base stations. The interstation communication manager may provide a standardized Xn interface, as defined by 3GPP standards, to support these communications.

FIG. 13 illustrates a flowchart 1300 of an example of a method that supports the indication of Network Coding Capabilities by a UE to a Base Station, on the Base Station side. The operation within this method may be implemented by a Base Station 1200, for instance, in the Communication Manager 1220 of FIG. 12.

The UE is assumed to be in connected mode, and UE is exchanging Control and User Data with the base station, in relation with FIG. 5.

As a background process, the Base Station follows up the evolution of the network system.

At step 1301 the Base Station detects the need for applying Network Coding on its connection with the UE. According to some embodiments of the invention this need may result from a degradation in the quality of transmission, due to the UE environment or to new interferences coming from connections of new UEs, or a new flow of data necessitating an Ultra Reliable Low Latency Communication. These are of course non-limitative examples and the one skilled in the art may consider several other causes for applying network coding.

If such need arises, then at step 1302 the Base Station sends through the Control Plane a request to the UE, to get information on the UE capacity to process Network Coding. In one embodiment of the invention, this request is performed through the RRC protocol message UECapability-Inquiry defined in the TS38.331.

According to one embodiment of the invention, the Base Station receives the UE Network Coding Capabilities in the protocol message UECapabilityInformation, at step 1303. According to one embodiment of the invention, this message may be the RRC UECapabilityInformation message defined in the TS38.331, amended to include an indication of the UE Network Coding Capabilities for Uplink and for Downlink, as described previously in the document, in relation with FIGS. 5 and 6. UECapabilityInformation message can be rather long, up to 4000 bytes. The Base Station must decode the message (encoded in ASN.1) and must extract the Network Coding Capability.

At step 1304, the base station stores the Network Coding Capability, using Parameter Manager 1030. It then sends the Network Coding Capability within a message containing all the UE capabilities to a Core Network entity.

At step 1305, the Network Coding Manager 1029 analyses the NC capabilities, for Uplink, and Downlink (number of legs possible to handle, restrictions . . . ), and sets the Network Coding encoding and/or decoding engines accordingly.

It may happen that the UE Network Coding Capabilities message is not received, or not recovered at Base Station. In one embodiment of the invention, both the UE and the base station are supposed to operate according to TS 38.331, which indicates the procedure to be applied when information have not been recovered.

Figure 14:
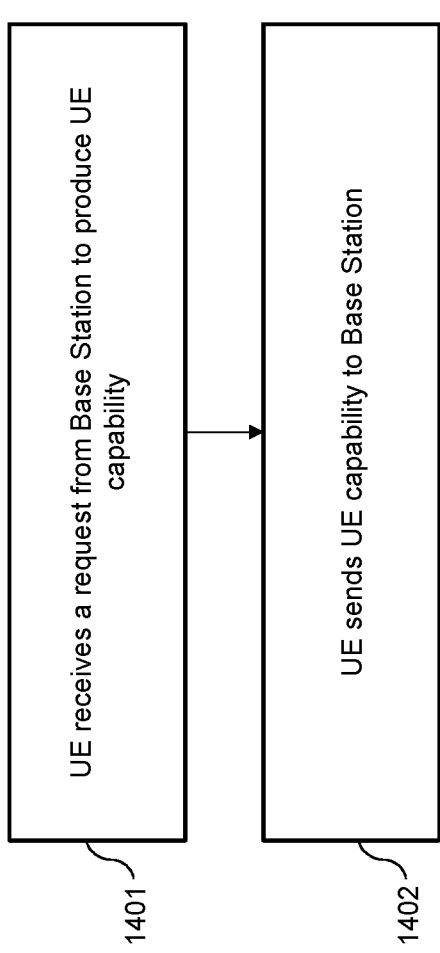
FIG. 14 illustrates a flowchart of an example of a method that supports the indication of Network Coding Capabilities by a UE to a Base Station, on the UE side.

FIG. 14 illustrates a flowchart 1400 of an example of a method that supports the indication of Network Coding Capabilities by a UE to a Base Station, on the UE side. The operation within this method may be implemented by a UE 1100 or within one of its components, for instance, the Communication Manager 1120 of FIG. 11.

The UE is assumed to be in connected mode, and UE is exchanging Control and User Data with the base station, in relation with FIG. 5.

As a background process, the UE checks at step 1401 if a request to produce UE capability is received from the Base Station. According to one embodiment of the invention, this request is the RRC protocol message UECapabilityEnquiry defined in the TS38.331.

At step 1402, after receiving this request, the UE prepares and sends a UECapabilityInformation message with its capabilities, including its Network Coding capabilities. According to one embodiment of the invention, this last message may be the RRC UECapabilityInformation message defined in the TS38.331, amended to include an indication of the UE Network Coding Capabilities for Uplink and for Downlink, as described previously in the document, in relation with FIG. 5.

Figure 15:
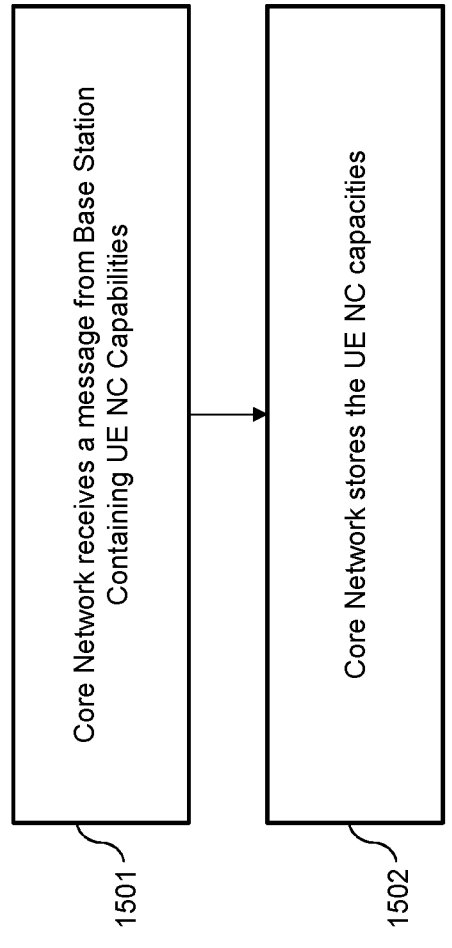
FIG. 15 illustrates a flowchart of an example of a method that supports the indication of Network Coding Capabilities by a UE to a Base Station, on the Core Network side.

FIG. 15 illustrates a flowchart 1500 of an example of a method that supports the indication of Network Coding Capabilities by a UE to a Base Station, on the Core Network side.

As a background process, a Core Network entity monitors the reception of a message containing the Network Coding Capability from the Base Station (step 1501). The message may be the NGAP message UE RADIO CAPABILITY INFO INDICATION described in TS 38.413 (version 16.1.0), amended to include an indication of the UE Network Coding Capabilities for Uplink and/or for Downlink, as described previously in the document.

At step 1502 after receiving this message, the core network entity stores this capability in Memory.

Figure 16:
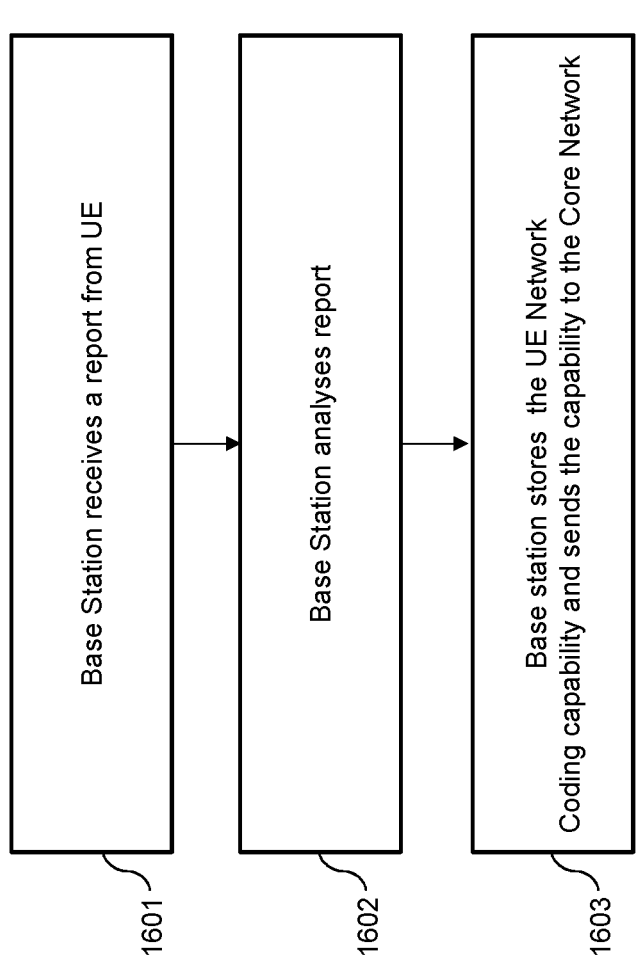
FIG. 16 illustrates a flowchart of an example of a method that supports the indication of Network Coding Capabilities by a UE to a Base Station, on the Base station side.

FIG. 16 illustrates a flowchart 1600 of an example of a method that supports the indication of Network Coding Capabilities by a UE to a Base Station, on the Base station side.

As a background process, the base station waits for control messages coming from the UE.

At step 1601 the base station receives a report message from the UE. This message may be, for instance, the RRC message UEAssistanceInformation described in TS 38.331 (version 16.0.0), or the RRC message SCGFailureInformation described in TS 38.331 (version 16.0.0 or the RRC message MesaurementReport described in TS 38.331 (version 16.0.0).

At step 1602 the base station analyses the message and determines if the report will affect (positively or negatively), even temporarily, the Network Coding Capability of the UE.

At step 1603 the Base Station may update and store the new Network Coding Capability and send to a Core Network entity a message containing the new Network Coding Capability. This last message may be the NGAP message UE RADIO CAPABILITY INFO INDICATION described in TS 38.413 (version 16.1.0).

Figure 17:
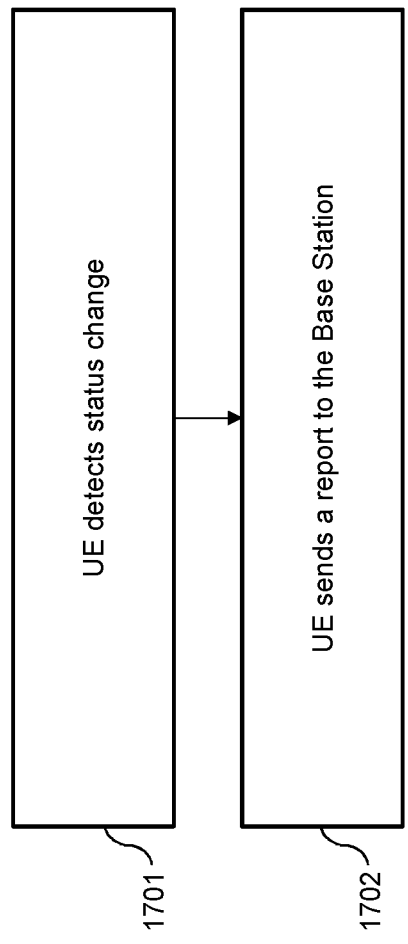
FIG. 17 illustrates a flowchart of an example of a method that supports the indication of Network Coding Capabilities by a UE to a Base Station, on the UE side.

FIG. 17 illustrates a flowchart 1700 of an example of a method that supports the indication of Network Coding

US 12,587,832 B2

3
4

Capabilities by a UE to a Base Station, on the UE side. As a background process, the UE checks its operating condition and its internal parameters.

At step 1701, the UE detects some change. In one embodiment of the invention, this may be an overheating situation, a transmission failure, an evolution of the wireless propagation conditions, etc. . . . . The one skilled in the art may find other noticeable changes the UE should report.

At step 1702, the UE sends a status report to the Base Station. In one embodiment of the invention, this message is the RRC message UEAssistanceInformation described in TS 38.331 (version 16.0.0). In another embodiment of the invention, this message is the RRC message SCGFailure-Information described in TS 38.331 (version 16.0.0). In yet another embodiment of the invention, this message is the RRC message MesaurementReport described in TS 38.331 (version 16.0.0).

Figure 18:
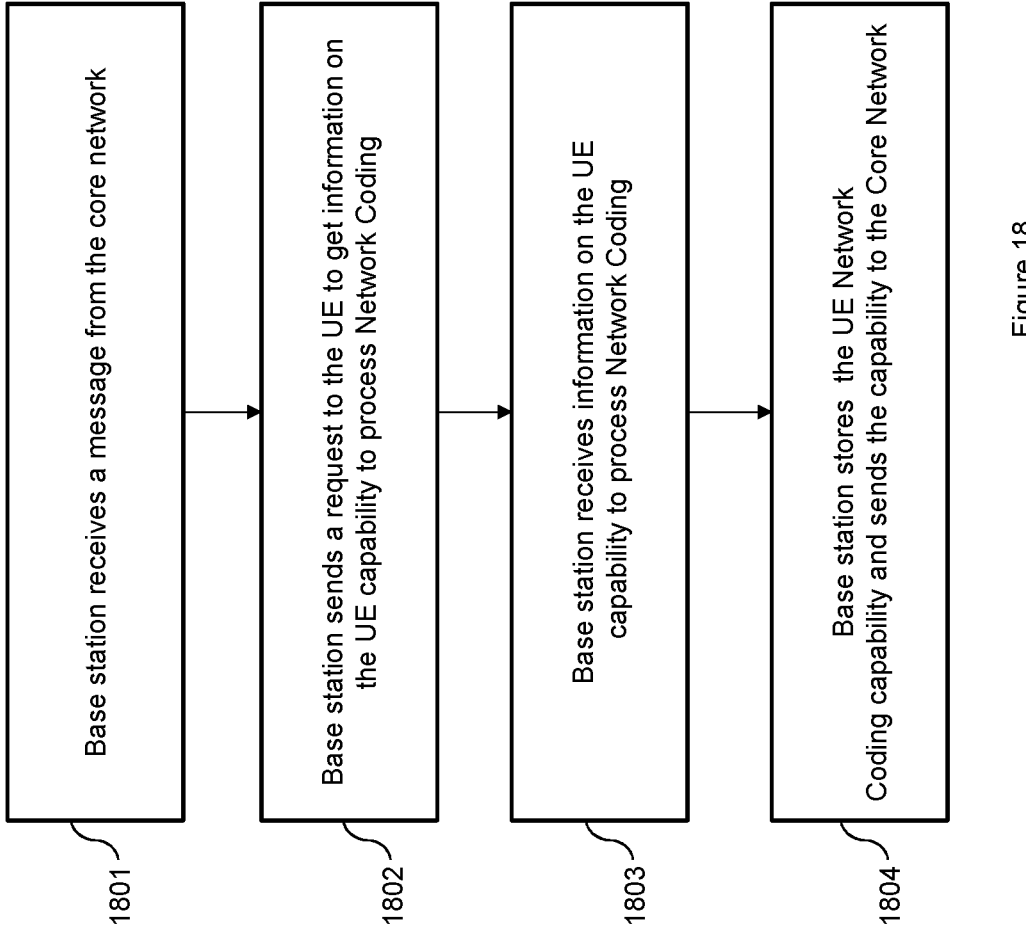
FIG. 18 illustrates a flowchart of an example of a method that supports the indication of Network Coding Capabilities by a UE to a Base Station, on the Base Station side.

FIG. 18 illustrates a flowchart 1800 of an example of a method that supports the indication of Network Coding Capabilities by a UE to a Base Station, on the Base Station side.

As a background process, the base station waits for control messages coming from the Core Network.

At step 1801 the base station receives a message from a Core Network entity. This message may be the NGAP message UE RADIO CAPABILITY CHECK REQUEST described in TS 38.413 (version 16.1.0).

At step 1802, the Base Station sends a request to the UE. This request is, for instance, the RRC protocol message UECapabilityInquiry defined in the TS38.331 release 15 par. 5.6.1.1.

At step 1803, the Base Station receives a message from the UE. This message may be the RRC message UECapabilityInformation, amended to include an indication of the UE Network Coding Capabilities for Uplink and/or for Downlink, as described previously in the document.

At step 1804, the Base Station stores or updates the UE Network Coding Capability. Then it sends a message to the Core Network. The message may be the NGAP message UE RADIO CAPABILITY INFO INDICATION described in TS 38.413 (version 16.1.0).

Figure 19:
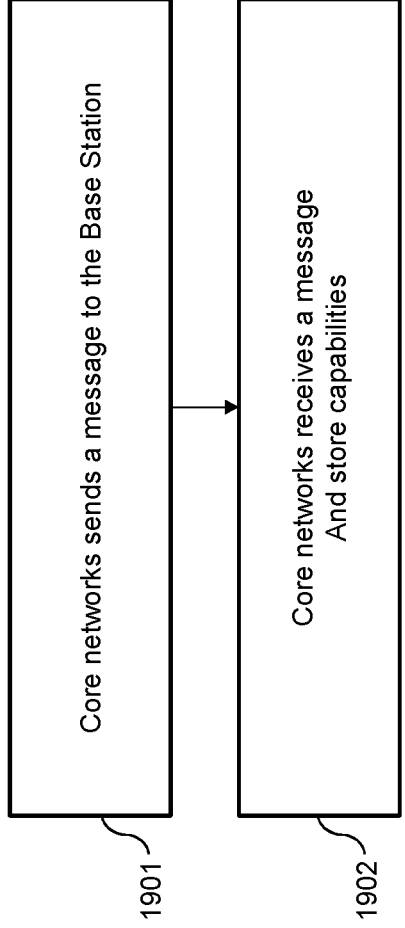
FIG. 19 illustrates a flowchart of an example of a method that supports the indication of Network Coding Capabilities by a UE to a Base Station, on the Core Network side.

FIG. 19 illustrates a flowchart 1900 of an example of a method that supports the indication of Network Coding Capabilities by a UE to a Base Station, on the Core Network side.

At step 1901, the Core Network sends a message to the Base Station. For instance, this message may be the NGAP message UE RADIO CAPABILITY CHECK REQUEST described in TS 38.413 (version 16.1.0).

At step 1902, the Core Network receives a message from the Base Station. This message may be for example the NGAP message UE RADIO CAPABILITY INFO INDICATION described in TS 38.413 (version 16.1.0).

Figure 20:
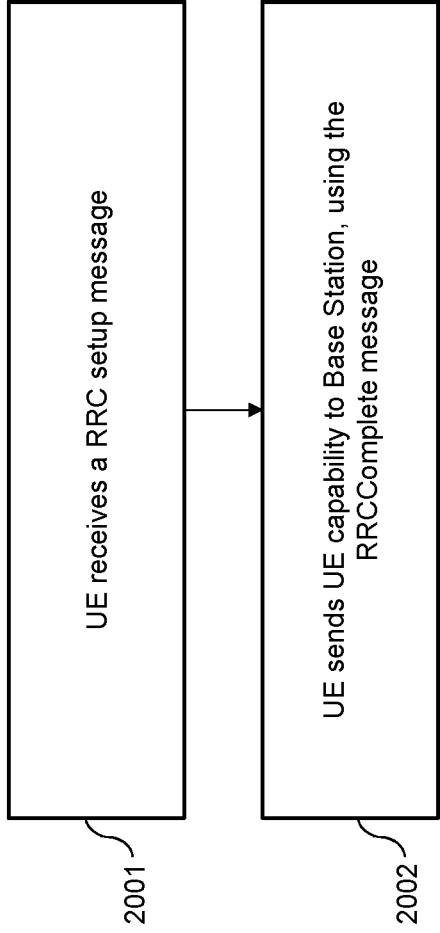
FIG. 20 illustrates a flowchart of an example of a method that supports the indication of Network Coding Capabilities by a UE to a Base Station, on the UE side.

FIG. 20 illustrates a flowchart 2000 of an example of a method that supports the indication of Network Coding Capabilities by a UE to a Base Station, on the UE side.

As a background process, the UE waits for RRC control messages coming from the Base Station.

At step 2001, the UE receives the RRCSetup message.

At step 2002, the UE sends a RRCComplete message. As per TS38.331, this message contains all the UE capabilities, amended to include an indication of the UE Network Coding Capabilities for Uplink and/or for Downlink, as described previously in the document.

Figure 21:
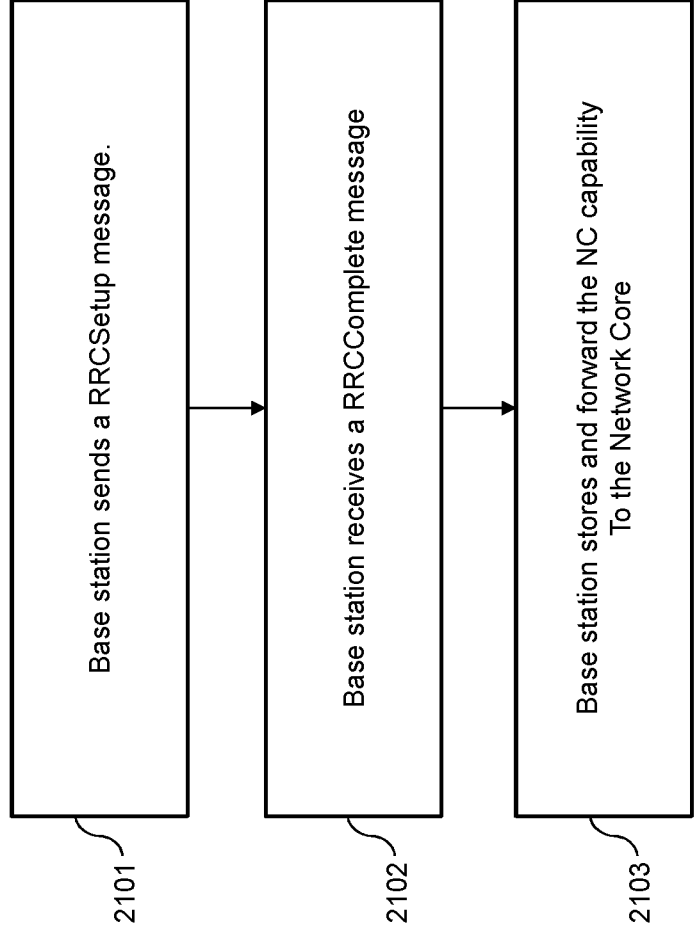
FIG. 21 illustrates a flowchart of an example of a method that supports the indication of Network Coding Capabilities by a UE to a Base Station, on the Base Station side.

FIG. 21 illustrates a flowchart 2100 of an example of a method that supports the indication of Network Coding Capabilities by a UE to a Base Station, on the Base Station side.

At step 2101, the Base Station sends a RRCSetup message (described in the specification TS38.331) to a UE. This message may be issued by the Base Station after the attachment of a UE to the Base Station using the Random Access Channel.

At step 2102, the Base Station receives the RRCComplete message (described in the specification TS38.331). This message contains UE capabilities, and may include an indication of the UE Network Coding Capabilities for Uplink and/or for Downlink, as described previously in the document.

At step 2103, the Base Station stores the UE's Network Coding Capability information embedded in the previously received RRCComplete message, and issues a message to the Network Core. This message may be for example the Initial UEmessage described in the specifications document TS 38.413.

Figure 22:
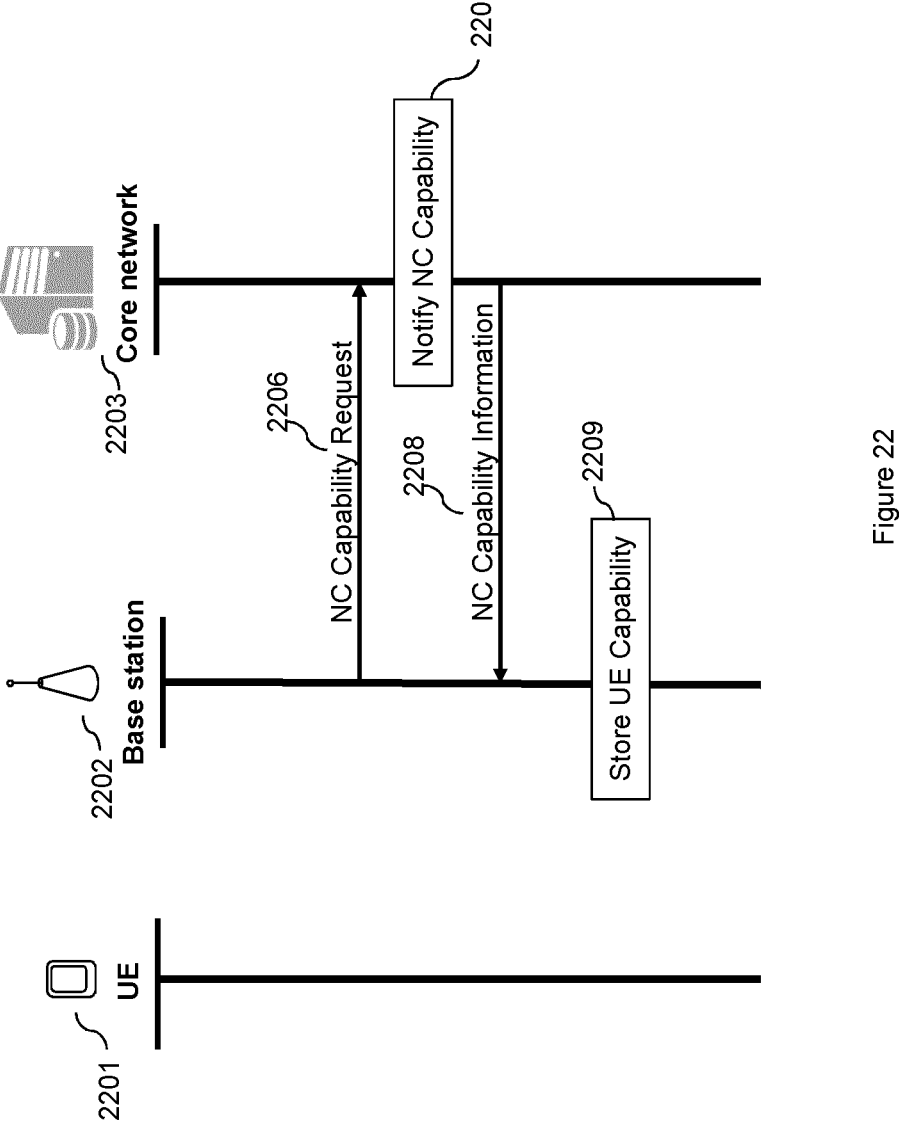
FIG. 22 illustrates an example of a process flow that supports network coding (NC) capability notification according to embodiments of the invention.

FIG. 22 illustrates an example of a process flow 2200 that supports network coding (NC) capability notification according to embodiments of the invention. It assumes that UE 2201 is in RRC connected state as defined in TS 38.331, meaning that UE 2201 is connected to a base station 2202 (which may be a gNB in a 5G NR network). The UE 2201 may be registered in core network entity 2203. In one embodiment of the invention, the core network is a 5G core network and core network entity 2203 is the Access and Mobility Management Function (AMF), as defined in 3GPP standard TS 23.501.

According to one embodiment of the invention, UE 2201 refers to UE 101 of FIG. 1 or UE 201 of FIG. 2. According to another embodiment of the invention, base station 2202 refers to base station 102 of FIG. 1 or base station 202-*a* of FIG. 2.

At some point, base station 2202 may require the capabilities of UE 2201 and in particular its NC capability. It may be a systematic check once a UE is connected or registered. It may also be triggered when a data flow has to be transmitted to or received from UE 2201.

For this purpose, a message 2206 is sent to core network entity 2203. In one embodiment of the invention, message 2206 may be a generic request to core network entity 2203 to provide UE 2201 capabilities regarding one or more features defined in 5G NR. In another embodiment of the invention, the message 2206 may request core network entity 2203 to provide the NC capability of UE 2201 only. In another embodiment of the invention, a sub-set of capability features, such as, but non-limited to, Carrier Aggregation, Dual-Connectivity or PDCP duplication, may also be requested through message 2206.

In one embodiment of the invention, message 2206 is a RRC message that would include a unique identifier of UE 2201 or class of the UE. In another embodiment of the invention, message 2206 is a RRC message that would also include some information related to a sub-set of UE 2201 capability features.

Through message 2206, core network entity 2203 receives the request to notify UE NC capability to base station 2202. In one embodiment of the invention, one or more other UE 2201 capability features are also requested. In step 2207, core network entity 2203 checks its internal parameters, and formats the response to be sent to base station 2202. The response is message 2208, which contains the NC capability information related to UE 2201. In one embodiment of the invention, message 2208 is an RRC message embedding UECapabilityInformation and defined in the specification document TS 38.331 (version 16.0.0), amended to include an indication of the UE Network Coding Capabilities as described in all or part of the several embodiments of the document dealing with NC Capability Information format.

In response to the reception of message 2208, in step 2209, base station 2202 stores the capabilities of UE 2201, including Network Coding capabilities, in an internal memory (e.g. RAM).

Figure 23:
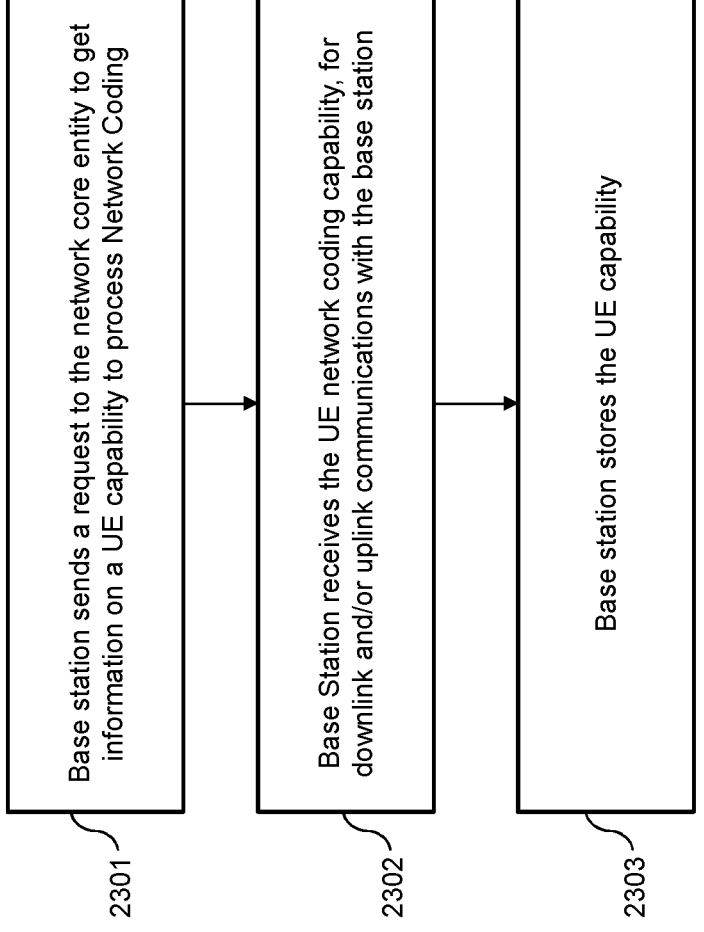
FIG. 23 presents a flowchart illustrating a method that supports Network Coding Capabilities indication for a given UE by a core network entity to a Base Station.

FIG. 23 presents a flowchart 2300 illustrating a method that supports Network Coding Capabilities indication for a given UE by a core network entity to a Base Station, on the Base Station side, in relation with FIG. 19.

The operation within this method may be implemented by a Base Station 1500, for instance, in the Communication Manager 1220 of FIG. 12.

At step 2301 the Base Station sends through the Control Plane a request to the core network entity, to get information on the capacity for at least one given UE to process Network Coding. In one embodiment of the invention, this request is performed through an RRC protocol message.

According to one embodiment of the invention, the Base Station receives the UE Network Coding Capabilities at step 2302 in a protocol message that embeds all or part of the information present in the UECapabilityInformation message defined in the TS38.331, amended to include an indication of the Network Coding Capabilities of the at least one given UE for Uplink and for Downlink, as described previously in the document, in relation with FIG. 22.

At step 2303, the base station stores the Network Coding Capability of the at least one UE, using Parameter Manager 1030.

It may happen that the UE Network Coding Capabilities message is not received, or not recovered at Base Station. In one embodiment of the invention, both the core network entity and the base station are supposed to operate a procedure to be applied when information have not been recovered.

Figure 24:
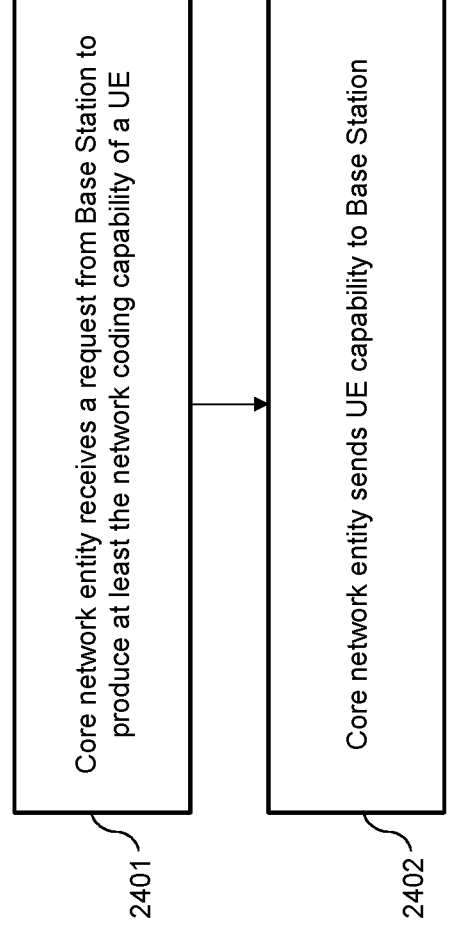
FIG. 24 presents a flowchart illustrating a method that supports the indication of Network Coding Capabilities by a Core Network entity to a Base Station, on the Core Network entity side.

FIG. 24 presents a flowchart 2400 illustrating a method that supports the indication of Network Coding Capabilities by a Core Network entity to a Base Station, on the Core Network entity side, in relation with FIG. 22. The operation within this method may be implemented by a Core Network entity. In one embodiment of the invention, the core network is a 5G core network and core network entity 2203 is the Access and Mobility Management Function (AMF), as defined in 3GPP standard TS 23.501.

As a background process, the Core Network entity checks at step 2401 if a request to produce UE capability is received from the Base Station.

At step 2402, after receiving a request from the Base Station to produce the capability, including network coding capability, of one or more UEs, the Core Network entity prepares and sends a message that embeds all or part of the information present in the UECapabilityInformation message defined in the TS38.331, amended to include an indication of the Network Coding Capabilities for the requested one or more UEs for Uplink and for Downlink, as described previously in the document, in relation with FIG. 22.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

An embodiment of the invention proposes a method for transmitting over a Radio Access Network (RAN) to a base station, by a User Equipment (UE), a Radio Resource Control (RRC) signaling indicating the capability of the UE to perform network coding.

Another embodiment of the invention proposes a method for transmitting over a core network to a core network entity, by a base station, a Radio Resource Control signaling indicating the capability of a user equipment (UE) connected to the base station to perform network coding.

Another embodiment of the invention proposes a method for transmitting over a core network to a base station, by a core network entity, a Radio Resource Control signaling indicating the capability of a user equipment (UE) connected to the base station to perform network coding.

The invention claimed is:

1. A method of transmitting over a radio access network to a base station, by a network entity, a radio resource control signalling indicating the capability of a user equipment to perform network coding, wherein the method comprises:

detecting by the network entity of a trigger event for signalling to the base station, the network coding capabilities of the user equipment;

generating by the network entity a radio resource control signalling message comprising the user equipment network coding capabilities;

transmitting by the network entity of the generated radio resource control signalling message to the base station; and wherein the method further comprises:

transmitting a status report for reporting a change in its internal parameters upon detection of the change, the status report being transmitted within a message different from the message comprising the network coding capabilities.

2. The method of claim 1, wherein the method further comprises:

receiving by the network entity of a radio resource control signalling request from the base station, this reception constituting the trigger event.

3. The method of claim 2, wherein the method further comprises:

checking the need for network coding activation by the base station prior to transmitting the radio resource control signalling request to the network entity.

4. The method of claim 1, wherein the method further comprises:

detecting by the network entity of a status change of the network entity, this status change constituting the trigger event.

5. The method according to claim 1, wherein the method further comprises:

transmitting by the base station to a core network a radio resource control signalling message comprising the user equipment network coding capabilities.

6. The method of claim 5, wherein the method further comprises:

receiving by the base station of a radio resource control signalling request from the core network prior to the transmission of the radio resource control signalling message to the core network.

7. The method of claim 5, wherein the user equipment network coding capabilities are stored by the core network.

8. The method of claim 1, wherein the user equipment network coding capabilities comprise information indicating that the user equipment supports network coding processing.

9. The method of claim 1, wherein the user equipment network coding capabilities comprises information indicating the network coding scheme supported by the user equipment.

10. The method of claim 9, wherein the information indicating the network coding scheme is related to an information on packet data convergence protocol packet duplication capabilities.

11. The method of claim 1, wherein the user equipment network coding capabilities comprise information related to some network coding capability restrictions.

12. The method of claim 1, wherein the user equipment network coding capabilities comprise information indicating the support of network coding through multi-connectivity.

13. The method of claim 1, wherein the user equipment network coding capabilities comprise information indicating the support of network coding through carrier aggregation.

14. The method of claim 1, wherein the user equipment network coding capabilities comprise information indicating the support of network coding encoding, decoding, or encoding and decoding.

15. The method of claim 1, wherein the user equipment network coding capabilities comprise information indicating a maximum of supported streams on which network coding is applied.

16. The method of claim 1, wherein the user equipment network coding capabilities comprise information related to the processor capacity of the user equipment.

17. The method of claim 1, wherein the user equipment network coding capabilities comprise information indicating a temporary incapacity to perform network coding processing.

18. The method of claim 1, wherein the user equipment network coding capabilities comprise information of a class of the user equipment, the class being associated with a set of network coding capabilities.

19. The method according to claim 1, wherein the method further comprises:

activating by the base station of the network coding according to the capabilities of the user equipment to perform network coding.

20. A non-transitory computer-readable storage medium storing instructions of a computer program for implementing a method according to claim 1.

21. A network entity device for transmitting over a radio access network to a base station, a radio resource control signalling indicating the capability of a user equipment to perform network coding, wherein the network entity device comprises a processor configured for:

detecting a trigger event for signalling to the base station, the network coding capabilities of the user equipment;

generating a radio resource control signalling message comprising the user equipment network coding capabilities; and transmitting by the network entity of the generated radio resource control signalling message to the base station; and wherein the method further comprises:

transmitting a status report for reporting a change in its internal parameters upon detection of the change, the status report being transmitted within a message different from the message comprising the network coding capabilities.

22. The method of claim 1, wherein the status report is a status report for updating an already stored network coding capabilities.

* * * * *